United States Patent
Panigrahy et al.

(10) Patent No.: US 8,069,374 B2
(45) Date of Patent: Nov. 29, 2011

(54) FINGERPRINTING EVENT LOGS FOR SYSTEM MANAGEMENT TROUBLESHOOTING

(75) Inventors: Rina Panigrahy, Sunnyvale, CA (US); Chad Verbowski, Redmond, WA (US); Yinglian Xie, Cupertino, CA (US); Junfeng Yang, New York City, NY (US); Ding Yuan, Champaign, IL (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/394,451

(22) Filed: Feb. 27, 2009

(65) Prior Publication Data

US 2010/0223499 A1   Sep. 2, 2010

(51) Int. Cl.
*G06F 11/00* (2006.01)
(52) U.S. Cl. ............... 714/38.1; 714/39; 714/45
(58) Field of Classification Search .......... 714/38, 714/38.1, 39, 45
See application file for complete search history.

(56) References Cited

U.S. PATENT DOCUMENTS

| | | | |
|---|---|---|---|
| 6,349,393 B1* | 2/2002 | Cox ................ | 714/38 |
| 6,470,375 B1 | 10/2002 | Whitner et al. | |
| 7,089,536 B2* | 8/2006 | Ueki et al. ............ | 717/131 |
| 7,263,632 B2* | 8/2007 | Ritz et al. ............ | 714/25 |
| 7,386,839 B1 | 6/2008 | Golender | |
| 7,483,970 B2* | 1/2009 | Anuszczyk et al. ......... | 709/224 |
| 7,725,943 B2* | 5/2010 | Shannon et al. ............. | 726/26 |
| 2004/0199828 A1* | 10/2004 | Cabezas et al. ............. | 714/39 |
| 2008/0244534 A1 | 10/2008 | Golender | |
| 2008/0276131 A1 | 11/2008 | Bantz | |
| 2010/0100774 A1* | 4/2010 | Ding et al. ............ | 714/45 |

OTHER PUBLICATIONS

Attariyan, et al., "Using Causality to Diagnose Configuration Bugs," USENIX 2008 Annual Technical Conference on Annual Technical Conference, Boston, Massachusettes, 2008.
Su, et al., "AutoBash: Improving configuration management with operating system causality analysis," SOSP '07, Oct. 14-17, 2007, Stevenson, Washington, US.
Wang, et al., "Automatic Misconfiguration Troubleshooting with PeerPresure," Proceedings of the 6th conference on Symposium on Operating Systems Design & Implementation—vol. 6, San Francisco, CA, 2004.
King, et al., "Debugging operating systems with time-traveling virtual machines," USENIX Association, 2005 USENIX Annual Technical Conference.
Mogul, "*Emergent (Mis)behavior* ;vs. *Complex Software Systems*," Proceedings of the 2006 EuroSys Conference, Apr. 18-21, 2006, Leuven, elgium.

(Continued)

*Primary Examiner* — Philip Guyton
(74) *Attorney, Agent, or Firm* — Vierra Magen Marcus & DeNiro LLP

(57) ABSTRACT

A technique for automatically detecting and correcting configuration errors in a computing system. In a learning process, recurring event sequences, including e.g., registry access events, are identified from event logs, and corresponding rules are developed. In a detecting phase, the rules are applied to detected event sequences to identify violations and to recover from failures. Event sequences across multiple hosts can be analyzed. The recurring event sequences are identified efficiently by flattening a hierarchical sequence of the events such as is obtained from the Sequitur algorithm. A trie is generated from the recurring event sequences and edges of nodes of the trie are marked as rule edges or non-rule edges. A rule is formed from a set of nodes connected by rule edges. The rules can be updated as additional event sequences are analyzed. False positive suppression policies include a violation-consistency policy and an expected event disappearance policy.

18 Claims, 15 Drawing Sheets

OTHER PUBLICATIONS

Tallann, "Fault Location and Avoidance in Long-Running MultiThreaded Applications," University of Arizona, Dissertation to Department of Computer Science for the Degree of Doctor of Philosophy, 2007.

Verbowski, et al., "Flight Data Recorder: Monitoring Persistent-State Interactions to Improve Systems Management," Microsoft Research, Proceedings of the 7th Symposium on operating system design and implementation, Seattle, Washington, 2006.

Manning, et al., "Identifying Hierarchical Structure in Sequences: A linear-time algorithm," Journal of Artificial Intelligence Research, Sep. 1997.

Rabin, "Fingerprinting by Random Polynomials," Center for Research on computing technology, Harvard University, TR-15-81 (1981).

Crandall, "Temporal Search: Detecting Hidden Malware Timebombs with Virtual Machines," University of California at Davis and Santa Barbara, ASPLOS '06, Oct. 21-25, 2006, San Jose, California.

Brumley, "Towards Automatic Discovery of Deviations in Binary Implementations with Applications to Error Detection and Fingerprint Generation," Proceedings of the 16th USENIX Security Symposium on USENIX Security Symposium, Boston, Massachusettes, 2007.

\* cited by examiner

Fig. 3b

| Symbol number: | Event string: | Grammar: | Note: |
|---|---|---|---|
| 1 | a | S → a | |
| 2 | ab | S → ab | |
| 3 | abc | S → abc | |
| 4 | abcd | S → abcd | |
| 5 | abcdb | S → abcdb | |
| 6 | abcdbc | S → abcdbc | bc appears twice |
| | | S → aAdA<br>A → bc | enforce digram uniqueness |
| 7 | abcdbca | S → aAdAa<br>A → bc | |
| 8 | abcdbcab | S → aAdAab<br>A → bc | |
| 9 | abcdbcabc | S → aAdAabc<br>A → Bc | bc appears three times |
| | | S → aAdAaA<br>A → Bc | enforce digram uniqueness.<br>aA appears twice |
| | | S → BdAB<br>A → bc<br>B → aA | enforce digram uniqueness |
| 10 | abcdbcabcd | S → BdABd<br>A → bc<br>B → aA | Bd appears twice |
| | | S → CAC<br>A → bc<br>B → aA<br>C → Bd | enforce digram uniqueness.<br>B is only used once |
| | | S → CAC<br>A → bc<br>C → aAd | enforce rule utility |

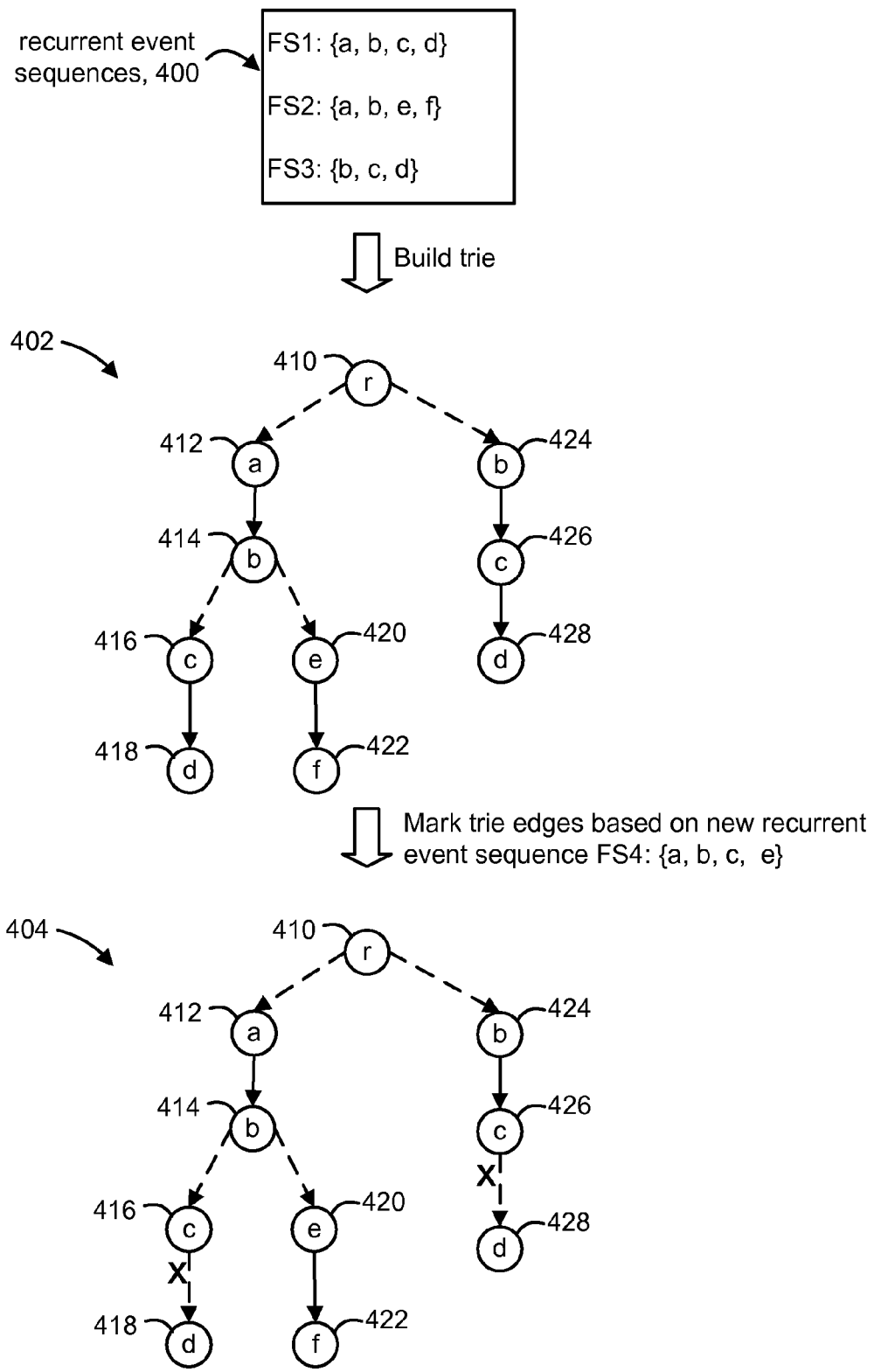

Fig. 4b

Trie Edge Marking (event)

1: \\nodeQueue[event.threadID] stores the parent node
2: \\of the current event, given events seen so far.
3: for i = nodeQueue[event.threadID]; $i > 0$; $i$ - - do
4:   parentNode = nodeQueue[event.threadID].Dequeue ();
5:   if parentNode contains a childNode correponding to event then
6:     \\Found match child, go down a level.
7:     nodeQueue[event.threadID].Enqueue(childNode)
8:   else if parentNode is a rule source node then
9:     \\Violating the rule.
10:    Un-mark the edge from parentNode
11: end if
12: end for
13: \\We also start from the root.
14: if root contains a childNode corresponding to event then
15:   nodeQueue[event.threadID].Enqueue(childNode)
16: end if

Fig. 4c

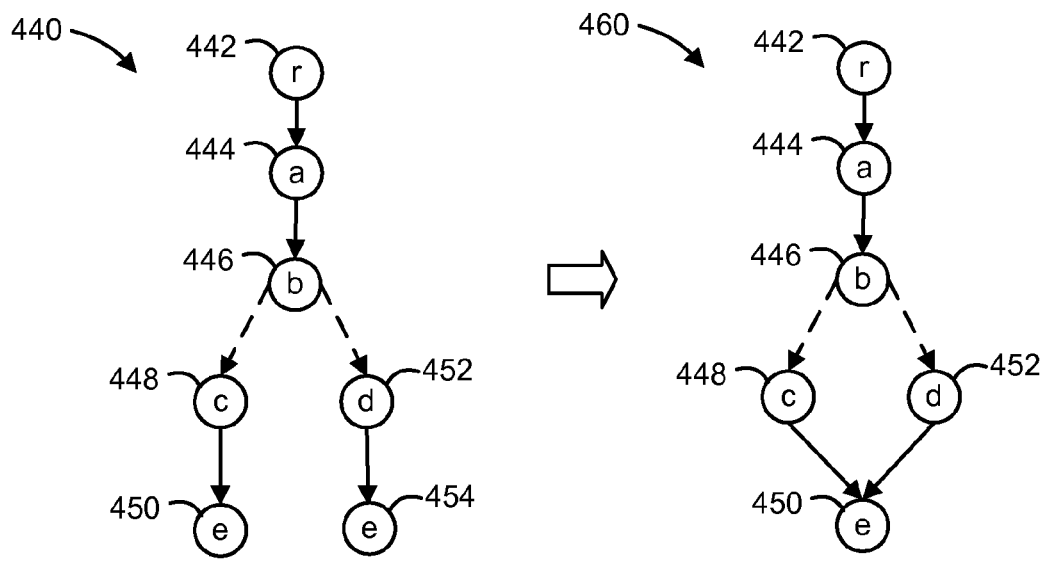

| | | Machine OS and IE version | | | |
|---|---|---|---|---|---|
| | | Server 03 IE 6 | Vista IE 7 | XP IE 7 | XP IE 7 | XP-VM IE 6 |
| Error | Double click | 1/1 | 1/1 | 1/3 | 1/3 | 1/2 |
| | Advanced | 1/1 | 1/1 | 1/2 | 1/1 | 1/6 |
| | IE search | 1/10 | NA | NA | NA | 1/7 |
| | Brandbitmap | NA | NA | NA | NA | 1/3 |
| | Title | 1/1 | 1/1 | 1/2 | 1/3 | 1/3 |
| | Explorer policy | 1/1 | 1/2 | 1/2 | 1/5 | 1/2 |
| | Shortcut | 1/1 | 1/1 | 1/3 | 1/1 | 1/2 |
| | Password | NA | 1/2 | 1/1 | 1/2 | 1/2 |
| | IE Offline | 1/1 | 1/1 | 1/2 | -- | 1/1 |
| | Outlook empty trash | 1/2 | 1/2 | 1/2 | 1/2 | NA |

Fig. 12b
| | Machine | No. of processes | Events per day (10⁶) | Alarms per day |
|---|---|---|---|---|
| Servers | S1 | 45 | 18 | 0.5 |
| | S2 | 42 | 16 | 0.8 |
| | S3 | 29 | 19 | 0.8 |
| | S4 | 32 | 18 | 0.6 |
| | S5 | 26 | 18 | 1.0 |
| | S6 | 28 | 20 | 0.7 |
| | S7 | 29 | 18 | 0.5 |
| | S8 | 27 | 19 | 1.1 |
| Desktop PCs | Server 2003 | 205 | 20 | 2.8 |
| | Vista | 185 | 10 | 4.4 |
| | XP SP2 | 213 | 11 | 5.3 |
| | Vista | 217 | 25 | 6.3 |
Fig. 13a
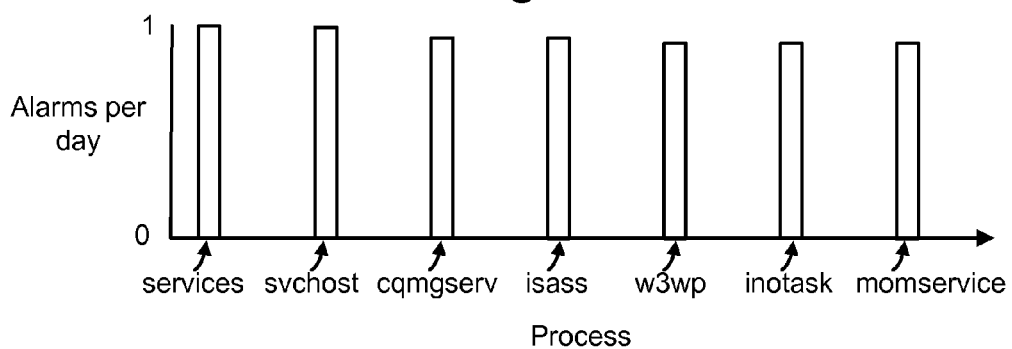
Fig. 13b
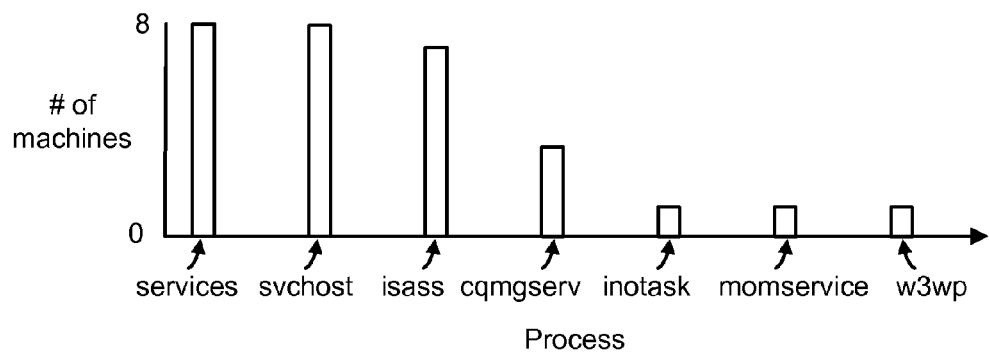

FINGERPRINTING EVENT LOGS FOR SYSTEM MANAGEMENT TROUBLESHOOTING

BACKGROUND

System management is a difficult task. Systems management generally includes enterprise-wide administration of distributed computer systems, and may involve one or more of the following tasks: managing hardware inventories, server availability monitoring and metrics, software inventory and installation, anti-virus and anti-malware management, user activity monitoring, capacity monitoring, security management, storage management and network capacity and utilization monitoring.

However, software failures are commonplace as computer systems become larger and more complex. Detection and diagnosis of software errors is a major administration cost, especially in server farm or data center environments where problems often go undetected.

Many software failures are caused by configuration errors. Such failures, or errors, can be triggered by a variety of reasons, including administrator mistakes, disk corruption, software bugs and malware. Since software configurations are persistent, configuration errors cannot be easily fixed with simple rebooting. Typical solutions involve prolonged manual troubleshooting sessions, or re-imaging the problematic machines, at the risk of losing data. The problem of managing software configurations in a large data center with tens to hundreds of thousands machines is even more costly due to the large number of computers and their diverse applications and workloads.

While several approaches have attempted to automate configuration error troubleshooting, they all rely on administrators or other users to detect the symptoms of errors in the first place. However, such manual detection is unreliable. To list a few examples, inexperienced users may not correlate the application failures they are experiencing with configuration errors; in a data center environment, administrators cannot afford to simultaneously monitor thousands of machines; in the worst case, a user may never notice anything on the surface, while her machine's underlying security policy leaves doors wide open to attackers. As a result, a user may detect a configuration error only after a long delay, when severe damage has already been done, making it impossible to recover the badly corrupted machine state.

Improved techniques are need for troubleshooting configuration errors.

SUMMARY

Techniques for troubleshooting configuration errors are presented. We address the problem of enabling automatic computer management troubleshooting by logging and analyzing massive amount of events generated by program executions. The events we collect include registry access events, file system events, and module load events of all processes running on a computer. Instead of looking at individual events, we examine recurring event sequences and automatically generate event transition rules as "program execution fingerprints" that the normal program execution has to follow.

Using a small number of such "program execution fingerprints" that are invariant for each process across time, we can automate the tasks of both detecting and diagnosing corrupted registry keys/files with a low false positive and false negative rate. Our approach can be applied to troubleshoot configuration errors on both single computers as well as across data centers, where machines are more likely to have homogeneous configurations and thus share similar event transition rules.

We match new event sequences against the generated rules using an optimized trie data structure. Violation of rules will raise an alarm and the corrupted registry keys/files can be diagnosed by comparing the violation events against the expected events.

In one aspect, a computer-implemented method for troubleshooting configuration errors includes obtaining a log of events which are generated as a program executes in a learning phase, and analyzing events generated during the learning phase to identify recurring event sequences. Each recurring event sequence includes a sequence of multiple events ordered in time. The method further includes generating rules based on the recurring event sequences, obtaining a log of events which are generated as the program executes in a detection phase, applying the rules to events of the detection phase to determine if a sequence of events of the detection process violates at least one of the rules, and reporting an alarm based on whether the sequence of the events of the detection process violates at least one of the rules.

In another aspect, a computer-implemented method for troubleshooting configuration errors includes obtaining a log of events which are generated as a program executes, where the log of events includes a registry event about the access (e.g., open, query value, delete, create, modify) of a registry key. The method further includes applying rules to events of the log to determine if a sequence of events violates at least one of the rules. When the sequence of events violates at least one of the rules, the method includes determining if the registry key has been one of: (a) deleted and (b) modified, and restoring the registry key to an expected key if the registry key has been one of: (a) deleted and (b) modified, where the rules identify the expected key.

In another aspect, a computer readable media has computer readable software embodied thereon for programming at least one processor to perform a method. The method includes obtaining a log of events which are generated as a program executes, and obtaining a hierarchical sequence which represents a sequence of the events. The hierarchical sequence represents the sequence of the events in a compressed form by symbols, and a plurality of the symbols represent multiple events. The method further includes flattening the hierarchical sequence to obtain a flattened hierarchical sequence, identifying sequences of events of the flattened hierarchical sequence that recur relatively often, according to a threshold, and storing the recurring sequences of events for comparison against other events in an automatic error detection process.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 3b depicts a process for generating hierarchical grammar rules from an event sequence.

FIG. 4a shows the construction of an example trie based on identified recurring event sequences and identifying rule edges of the trie.

FIG. 4b depicts a trie edge marking algorithm.

FIG. 4c depicts merging of child nodes in a trie edge marking algorithm.

FIG. 12b depicts a number of alarms for all processes on healthy logs.

FIG. 13a depicts a number of alarms per day across different processes.

FIG. 13b depicts a number of server machines which generate alarms across different processes.

DETAILED DESCRIPTION

1. Introduction

Techniques are presented for automatically detecting and diagnosing software configuration errors in a computer system. A learning mode is used to identify invariant configuration access rules that a program execution has to follow. Using these rules as a context, the technique sifts through voluminous events and detects deviant program executions in an online fashion. This is in contrast to previous approaches that focus on offline diagnosis only. The technique is efficient, lightweight, and scalable, and can successfully detect real world configuration errors in different operating system (OS) environments. The technique has a low false positive rate when analyzing month long event traces from both user desktops and server farms. The scalability makes it a practical management tool that can be widely deployed at machine clusters with a low overhead.

In particular, the technique provides a tool that can automate the process of both detecting and diagnosing software configuration errors. Unlike previous approaches that adopt virtual machine monitoring or kernel tracking, we focus on analyzing configuration access events that can be monitored and collected with a low overhead. This approach is particularly attractive for managing production server clusters or data centers, where management tasks must not interfere with regular server workloads.

Figure 1:
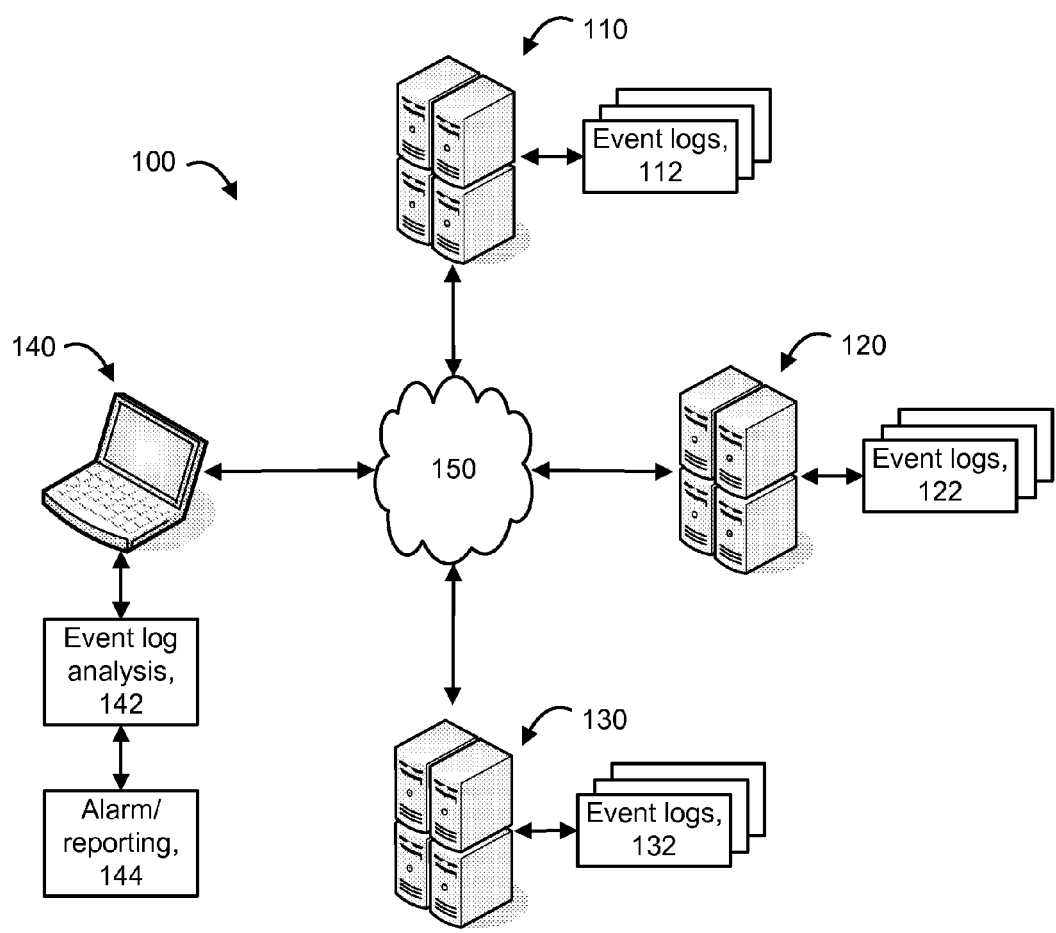
FIG. 1 depicts an example distributed computing system having a number of server clusters.

FIG. 1 depicts an example distributed computing system 100 having a number of server clusters 110, 120 and 130 which store event logs 112, 122, and 132, respectively. An administrator laptop 140 can access the event logs via a network medium 150 and use an event analysis tool 142 as discussed herein to automatically identify certain event sequences. An alarm/reporting function (144) can also be accessed to provide a useful output. The computing system could alternatively or additionally include end user computers, such as desktop or laptop computers or portable devices such as personal digital assistant or cell phones, computerized home appliance device, and the like, or essentially any device which runs a microprocessor which generates events. Note although in this figure, the device analyzing events and the devices generating events are different ones (i.e., a laptop and servers), it is not necessary for the two operations (event analysis and event generation) to happen at different devices. In other words, the event analysis device and the event generation device can be the same device.

Examples of alarms/reports are provided, e.g. in FIGS. 7, 8 and 12b-14. Such alarms/reports can be provided on a GUI of an administrator (e.g., on laptop 140), printed in hardcopy, stored in memory and/or reported by email, text message or other means. The alarms/reports can be output in a log file. A report can include an identification of an event and an identification of which rule has been violated. We can use the rule as a key into a table which identifies the events which are part of the rule, and so we can see the various events. The output can be similar to results of a database query. We can also identify the time and the process involved in the event. A user tool could be something like an anti-virus scanner where a message window pops up if something abnormal happens, such as a configuration error or a broken registry key. We can also suggest how to automatically recover from an error. We know what the expected event is. For example, we expect a certain registry event to happen with certain values or data fields and the event observed is the same key but with a different value or different data field. We know that the fields of this particular registry key may be corrupted in some way and since we know the expected values, we can suggest changing the current value to the expected value and that may fix the problem. We can also report the number of times a problem occurs.

While logging events is straightforward, analyzing them to accurately detect abnormal patterns or corrupted states is extremely challenging. The major difficulty is in dealing with the complexity of the huge volume of data.

In the example of registry events of the MICROSOFT WINDOWS OS, a typical desktop PC or server process can generates on the order of $10^6$ to $10^8$ of events on a daily basis. Given that each machine has about $10^2$ to $10^3$ processes, a typical data center with 1000 machines can generate $10^{11}$-$10^{13}$ events every day. The WINDOWS registry is a directory which stores settings and options (collectively, configuration settings). It contains information and settings for all the hardware, operating system software, most non-operating system software, and per-user settings. The registry also provides a window into the operation of the kernel, exposing runtime information such as performance counters and currently active hardware. The registry organizes configuration settings for WINDOWS programs. WINDOWS is mentioned as an example of an OS, and in other examples herein. However, the techniques provided herein are suitable for use with any type of OS, including others such as Mac OS, Linux, Berkeley Software Distribution (BSD) and Solaris.

Moreover, an event may represent an action that is usually initiated outside the scope of a program and that is handled by a piece of code inside the program. An event may be initiated in a program, e.g., by a mouse click, keyboard press, message from another program, or hardware device such as a timer.

The event is typically processed by a subroutine of the program known as an event handler. Libraries may be used to dispatch an event to multiple handlers that are programmed to listen for a particular event. The data associated with an event can specify what type of event it is, other information such as when it occurred, who or what caused it to occur, and extra data provided by the event source to the handler about how the event should be processed.

The events that we look at are not necessarily error events which indicate something is wrong. They are logs of activity that happens on a system and the activity can relate to data that is read from or written to a disk, or other storage medium, and programs that start running and the pieces of code that they are loading. These are low level activities. This is all the activity that is happening on the system and they are not necessarily labeled as being good or bad. An event is a sample of what is going on. For example, assume a computer wants to read something from disk; the attributes of that action are what we call an event. For example, this could be the time that it happens and other relevant parameters.

Another difficulty is in dealing with noise in the voluminous events. Noise can be caused by a variety of temporal configuration state accesses, and irregular configuration accesses due to software maintenance or updates. Both types of noise generate a large number of new configuration access events. The number of new unique events per host per hour can be as large as $10^4$-$10^5$ on average over time.

The approach adopted here performs automatic online detection and diagnosis of software configuration errors. It is based on an important observation that configuration accesses are determined by program execution flows. Hence they are essentially external reflections of the corresponding program control flows. This implies that the seemingly unrelated configuration access events are not independent. Rather, many events may have contexts which identify when and where the events occur. Exploring the context of these events can thus effectively identify out-of-context configuration access for error detection and diagnosis.

To efficiently extract configuration event context from a huge volume of noisy data, repetitive and predictable configuration event sequences are identified, instead of examining individual events in isolation. These extracted recurring event sequences are used to construct a small set of invariant configuration access rules that a program execution has to follow. A violation of a rule indicates an abnormal event transition. In this case, both the violating event and the expected event can be used to facilitate further diagnosis. This approach has an added benefit when applied in a server cluster or a data center environment, which often have homogeneous operating system and application settings. In this case, a small set of configuration access rules is sufficient to capture the similar program execution behaviors across a large number of hosts.

When evaluated, the technique successfully detected almost all real-world configuration errors that can be reproduced in our evaluation and randomly corrupted software configurations, with a low false negative rate. In all successful detection cases, it correctly ranks the corrupted software states as the root causes when doing error diagnosis. When evaluated on eight servers and four desktop machines, the false positive rate was on the order of 0.8 alarms per day for server computers and 4.6 alarms per day for user desktops.

Advantages of the technique include efficiency, light weight and scalability. Specifically, by efficiently processing events as they arrive online, time consuming offline processing is avoided. With offline processing, it takes on an average twelve hours to process one month's worth of registry event logs for each machine. In one example implementation, the technique adapts and modifies the Sequitur algorithm to process events for generating rules, as discussed further below. The Sequitur algorithm is discussed in C. G. Nevill-Manning et al., Identifying Hierarchical Structure in Sequences, J. of Artificial Intelligence Research vol. 7, pp. 67-82 (1997), incorporated herein by reference. However, other algorithms may be used as well. Sequitur is a recursive algorithm that infers a hierarchical structure (context-free grammar) from a sequence of discrete symbols. Sequitur-generated recurring sequences are hierarchical in their forms, and cannot be directly applied to generate event transition rules. We adapt the algorithm to generate flat event sequences in our analysis, and we further construct a trie to derive invariant event transition rules.

The technique is light weight because it does not require modifying kernels or installing virtual machines. By extracting a small number of configuration access rules, it has a small runtime overhead in terms of memory and CPU usage, without losing coverage. In our experiments, configuration rules consisting of a few to tens of hundreds of events can effectively cover a majority of all events generated over time.

The technique can be easily scaled to manage large server clusters or data centers. Since configuration access rules are very similar across different machines, the technique can be deployed at a centralized machine, monitoring and analyzing event streams from a large number of machines, without incurring high overhead.

In sum, the technique provides an automatic, online detection tool for handling configuration errors by exploring event sequences as contexts for automatic online configuration error detection and diagnosis.

2. Alternative Approaches

Alternative approaches assist the administrators in the process of diagnosing software failures such as by using user-defined predicates to test the system behavior. To automate this task, virtual machine checkpoints are used to maintain backup states of the entire system over time. In case of a failure, the administrator can quickly roll back to the previous states for error debugging. Another approach, instead of using virtual machines, leverages OS-level speculative execution to causally track activities across different processes in a complete system. It can apply and test fixes that may have worked in other systems. Another approach compares the configuration data on the system with typical values to identify atypical configurations that may be the cause of a problem. Such tools focus on reasoning about the correct system status snapshots, and use statistical tools to compare system configurations over history and across machines. While such approaches provide enhanced offline diagnosis capabilities, they require the users or the system administrators to be able to detect mis-configuration errors in the first place.

In contrast, the technique provided herein, in addition to assisting with diagnosis tasks, focuses on automatic online detection of configuration errors. Since computer systems are complex with dependencies among different processes and applications, the ability to identify faulty configuration states as early as possible can allow us to localize/isolate problems to a smaller set of processes for easier error diagnosis. The error detection capability is also helpful to detect configuration troubles at server clusters or data centers where problems are harder to identify, since the majority of the machines do not have a graphical user interface (GUI).

The technique provided herein attempts to reason about action rather than state by exploring the transitions between different events and their temporal orders/sequences. These transitions can be regarded as external reflections of a program execution. This is different from approaches that focus on static system states. Due to the noise (in terms of constantly appearing new events) present in configuration states, looking at single system snapshots tends to generate a large number of false positives.

The notions of event set and event transitions are explored to build program behavior profiles for automatic software classification or rule extraction. Event transition rules can include all possible lengths of prefixes, and have more flexibility and expressive power when representing event sequences as contexts.

Moreover, although our work targets at troubleshooting software failures instead of communication problems, it can also benefit from a global view of configuration-related events across the entire system, as will be illustrated further below (Section 8).

3. Methodology Overview

At a high level, we identify recurring, invariant configuration access sequences from program executions. Such access patterns are essentially external reflections of a program's control flow. They are process specific, and can be used to define a set of event transition rules that the corresponding process has to follow. A violation of rule implies abnormal changes in the corresponding process's control flow in accessing configuration states, and hence signals an alarm. In this case, the rule-violating events and the associated configuration states can be used to diagnose a problem's root cause.

We focus on the WINDOWS registry entries as the configuration states, and examine all registry access events of a machine. Our general approach, however, can be adapted to other types of configuration data or file system access patterns. It can work as a stand alone tool installed at each host, processing events as they arrive. Alternatively, it can be deployed at one or more centralized management computers for analyzing events streamed from distributed hosts in server farm environments or other locations (see Section 8).

Due to the convoluted structure of the WINDOWS registry, the first challenge we face is to deal with the complexity in terms of the high registry event volume of each process. With hundreds of millions events and tens of thousands of new events arriving each day on a single desktop machine, it is crucial to efficiently filter out noise and develop a small number of rules that summarize the invariant registry key access patterns. Our approach is to mine the recurring sequences of registry events for each process. By focusing on only recurring events, we can significantly filter out noisy temporary events. Introducing temporal order into our analysis by looking at event sequence offers us the opportunity to capture the underlying predictable control flows of a program.

The next challenge we face is how to leverage the derived recurring registry event sequences to detect errors. A key observation is that code statements or instructions are not isolated from each other in a program execution. Rather, each particular instruction should only happen under certain contexts. Such contexts include: (1) instructions before the particular instruction, but from the same basic code block, and (2) instructions from one or more previous basic blocks, before the basic block of the particular instruction. A basic block is code that has one entry point (i.e., no code within it is the destination of a jump instruction), one exit point and no jump instructions contained within it. The code may be source code, assembly code or some other sequence of instructions.

Given registry event sequences are one type of external reflection of a program execution, where each registry key access also has a context. For example, consider the sequence of events: a, b, c→d. This means event a occurs, followed by event b, followed by event c, followed by event d. We can therefore say that a set or sequence of events {a, b, c} is followed by event d, and thus provides a context for d. In this case, the context is a prefix or predecessor to d. We thus have a rule that d follows {a, b, c}.

We identify a set of event transition rules to specify the context of a registry key access event. Each rule can be in the above-mentioned format. In this example, we call the event sequence {a, b, c} the context of event d if and only if {a, b, c} will be always followed by d. In other words, for an event sequence be to recognized as a rule, it has to happen both repeatedly and deterministically. Once we see an unexpected event happening after a context, we know the corresponding rule is violated. For example, based on the rule a, b, c→d, if we observe a sequence of events {a, b, c, e}, the rule has been violated. In response, we can flag an alarm and perform further diagnosis.

Figure 2:
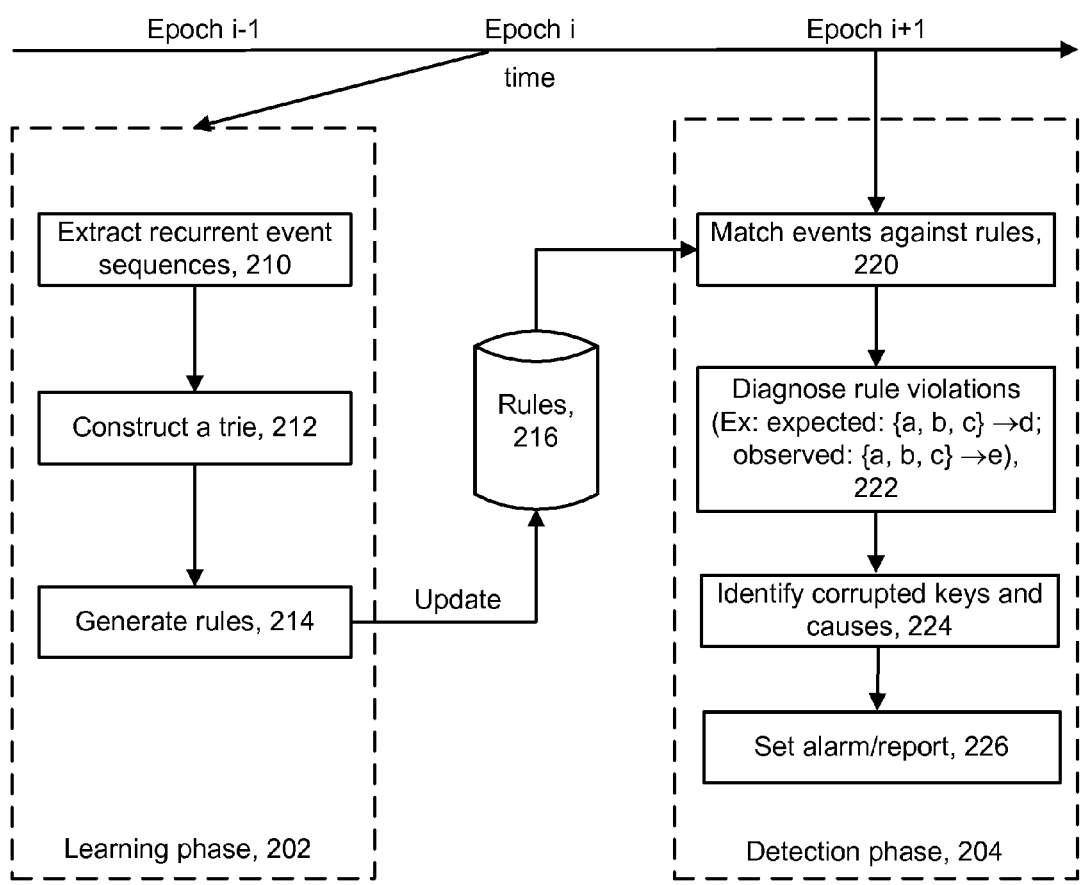
FIG. 2 depicts a process flow for learning rules and detecting violations of the rules.

FIG. 2 depicts a process flow for learning rules and detecting violations of the rules.

An input to the process is a sequence of registry key access events generated from a computer over time, and an output is a set of corrupted keys and potentially their possible causes. To perform online detection, at any time, a learning process (202) and a detection process (204) can occur simultaneously. The learning process generates new rules as events arrive and updates an existing set of rules (216).

The learning process generates rules using event logs collected from, e.g., healthy program executions. In other words, we assume there are no software failures or abnormal events in the learning process. The detection process uses the learned rules to perform anomaly detection and diagnosis. The learning process takes a sequence of events in their temporal order as inputs, and outputs a small number of event transition rules. Each rule is in the form of A→b, where A is a sequence of events and b is an individual event. The meaning of this rule is that if the sequence A of events is observed from a program execution, then A must be followed by the event b. Given the sequence of input events, the learning process involves:

1) Compute a hash value to represent each event. We can use Rabin fingerprints here so that each unique event comes with a unique hash value.
2) Use the Sequitur algorithm to identify hierarchical recurring event sequences.
3) Generate flat (on-hierarchical) recurring event sequences from the hierarchical sequences.
4) Select all the event sequences whose recurrence is above a pre-defined threshold.
5) Construct a suffix-merged trie using the above selected rules.
6) Identify event transition rules from the trie.

Specifically, at each epoch in FIG. 2, the learning process includes three steps: (1) extract (e.g., identify) recurring event sequences from all input events observed during this epoch (step 210), (2) construct a trie (i.e., a prefix tree) to aggregate the event sequences (step 212), and (3) derive invariant event transition rules (step 214). At the same time, the detection process cam be implemented to apply the already learned rules to perform error detection and diagnosis. To simplify our description, we use the learning process and the detection process to separately describe the two different operations.

The learning process derives a set of new rules periodically by epochs, or time intervals. At the end of every epoch, the process can update the set of rules (216) by both adding new rules learned at the current epoch and revising rules learned in previous epochs. The detection process can operate continuously. For each observed event, the detection process applies all the learned rules generated by previous epochs to detect rule violations. The rules can be gradually updated over time as they are learned, even as the detection process is carried out.

That is, the learning and the detection can be mostly concurrent. For example, assume a bootstrap program is used to run a program which carries out the learning mode. After five minutes, for instance, some rules are learned. Every five minutes we might update our rules. Whenever the rules are updated, they are used to detect the subsequent events. When the rules are being matched to the event sequences, we can also learn the rules at the same time because the rules can be updated. Thus, we can be constantly learning and detecting. It is also possible to completely separate the learning and detecting processes.

The detection process 204 takes two sets of inputs: (1) the set of rules generated from the learning process, and (2) the sequence of events for anomaly detection. The output of the detection process is a set of violated rules (if any) and the corresponding causes. In the registry key example, rule violations are in the form of the violating registry key access events and the expected events based on the corresponding rules. Such information can further be used to pinpoint the corrupted registry keys, their expected values, and the process that accessed or modified the corrupted registry keys. The detection process involves:

1) For each new event (represented as a hash value), walk it along the constructed trie from the learning process based on the location of the previous event on the trie. The first event starts from the top of the trie, and we identify all such top level nodes that match. For any other event, if the previous event is already at some locations on the trie, check if the current event matches any of the children of the previous event trie nodes (can be multiple of them).
2) If the event does not match any event on the trie based on the previous event location, check if a predefined transition rule has been violated.
3) If a transition rule has been violated, signal an alarm, and compare both the violating event and the expected event.
4) If transition rule has not been violated, start from the beginning of the trie and treat the current event as the first.

We illustrate the diagnosis process of the corrupted software state using the registry key event example. In this case, if the expected event is missing for some violation, we can check if the corresponding key has been deleted. If so, we can restore the key using the learned rules. We can alternatively check if the expected registry key value has been modified, and correct the value in a similar way.

Specifically, in FIG. 2, the detection process includes matching events against the rules (step 220) and diagnosing rule violations (222) to identify corrupt keys and their causes (224), and to set alarms and/or provide a report (226).

For example, in epoch i, new rules can be generated and used to update the existing rules, and in epoch i+1, rule violations can be detected. Each violated rule involves an expected event and an actual observed event. Both events, together with their context, are used to diagnose the alarm for root causes.

Both learning and detection are application-specific. We use the name of a process to group the set of processes/threads sharing the common executable name. And, each process group has a different set of event transition rules. We describe the details of both phases in the next section.

4. Learning Configuration Access Rules

This section describes how we derive the rules from input registry events. Given the huge volume of registry key events, when learning the event rules, the process should be efficient, having low timing complexity to process events as they arrive, and lightweight, in that the set of rules generated after learning should be compact enough to fit into memory for efficient detection and diagnosis. Throughout, the process has linear time complexity in the number of events processed. We will also show in Section 7.1 that the size of all rules for most processes is only on the order of hundreds to thousands of events.

4.1 Identifying Recurring Sequences

Regarding step 210 of FIG. 2, the input to this system component can be a sequence of registry key events. A registry contains two basic elements: keys and data values. In an example implementation, each event entry contains the following information: event timestamp, process name, process ID, thread ID, registry key, registry value, registry data field, and the operation type. Conceptually, the registry key is like a directory in the file system. Each key may have multiple values, like multiple files under the directory, and data is the content of each value, like the content of a file. The registry, like a file system, is in a hierarchical structure, so each key may have multiple subkeys, which may contain further subkeys, and so on. Keys can be referenced with a syntax similar to WINDOWS path names, using backslashes to indicate levels of the hierarchy. Registry values are name/data pairs stored within keys. Values are referenced separately from keys. Value names can also contain backslashes. The WINDOWS API functions that query and manipulate registry values take value names separately from the key path and/or handle that identify the parent key. To access a key, the program must start with the root key, and gradually traverse down to the key it wants to access. Table 1 shows an example of registry event.

TABLE 1

Key: C:\main\registry\machine\software\perl
Value: BinDir
Data: C:\Perl\bin\perl.exe
Operation: open key Here, c:\main\registry\machine\software\perl" refers to the subkey "perl" of the subkey "software" of the subkey "machine" of the subkey "registry" of the highest level key "main." "BinDir" is the value of the key. The data of the registry is at the location "C:\Perl\bin\perl.exe." The registry operation is "open key."

For compact representation, in one possible implementation, we can generate a hash value in terms of a Rabin fingerprint to represent each unique event excluding the timestamp field. See M. O. Rabin, Fingerprinting by random polynomials, Center for Research in Computing Tech., Harvard Univ., Report TR-15-81 (1981), incorporated herein by reference. The Rabin fingerprinting scheme is a method for implementing public key fingerprints using polynomials over a finite field. Given an n-bit message $m_0, \ldots, m_{n-1}$, (e.g., which represents an event) we view it as a polynomial of degree n−1 over the finite field GF(2): $f(x)=m_0+m_1x+m_2x^2+ \ldots +m_{n-1}n^{n-1}$. We then pick a random irreducible polynomial p(x) of degree k over GF(2) (Galois field with 2 elements), and we define the fingerprint of m to be: f(x) mod p(x), which can be viewed as a polynomial of degree k−1 or as a k-bit number.

Figure 3A:
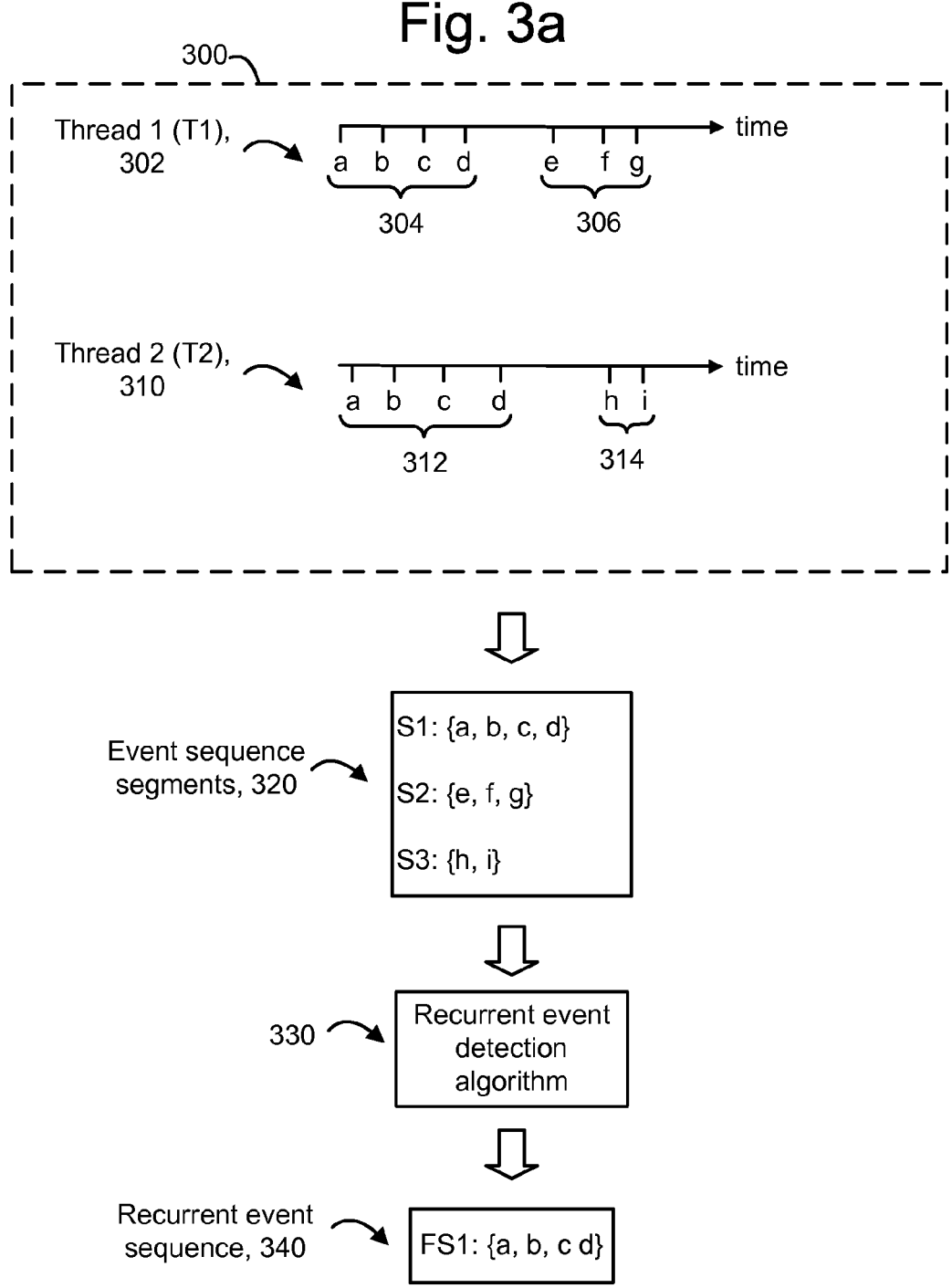
FIG. 3a depicts a process flow for identifying recurring event sequences.

FIG. 3a depicts a process flow for identifying recurring event sequences. Note that many applications have multiple processes and threads running concurrently, and their registry events will be interleaved in timing when we treat them as one sequence. Generally, a thread of execution is a fork of a computer program into two or more concurrently running tasks. The implementation of threads and processes differs from one OS to another, but in general, a thread is contained inside a process and different threads in the same process share some resources (most commonly memory), while different processes do not.

We are interested in specific sequences that occur multiple times. For example, assume a program is trying to write some information to a file and it fails. It goes to open the file and it has an error and it stops and it tries again and again. We would see that retrying process as a sequence: it might be open file, write file, open file, write file, get error message. That sequence includes three different events. If we see that this retrying occurs over and over, this can indicate bad behavior. Another example sequence occurs when we go to start a program and we click on a desktop program/application such as WORD, OUTLOOK or EXCEL. The computer would see a mouse click and the program file loading up into memory and then reading some of its settings. That would also be a set of sequences. We might see that every time a program starts this same sequence happens over and over. An error might occur when we detect a known bad sequence such as file writing that fails over and over, or the lack of a known good sequence such as not seeing a certain pattern when the program opens. It is hard to know because of customizations and slight differences between computers whether this pattern will exist on every machine or whether it is specific to a certain computer. That is why discovering the patterns is important.

For example, we might have a word processor program that is running and we obtain certain rules. We know that when the word processor runs, it will generate certain events which will always be in a certain order. If we see a violation of those event sequences, we know something is wrong during the execution of that program.

In FIG. 3a, a thread Ti (302) and a thread T2 (310) are depicted in box 300. The two threads are of the same process. Generally, different threads of a process can be analyzed, or different threads from different processes can be analyzed, as long as their corresponding processes are launched from a common executable. This is a simplified illustration since, in practice, may more threads and events can be involved. Each thread includes events that were generated at different times, as indicated by their position along respective corresponding time axes. For example, Ti includes events a, b, c, d, e, f and g, while T2 includes events a, b, c, d, h, and i. Further, for Ti, events a, b, c and d are grouped in a set 304 since they are proximate in time, while events e, f and g are grouped in a set 306 since they are also proximate in time. There is a relatively large time gap between d and e, indicating that these events should be grouped separately. For T2, events a, b, c, d are grouped in a set 312 since they are proximate in time, while events h and i are grouped in a set 314 since they are also proximate in time. There is a relatively large time gap between d and h, indicating that these events should be grouped separately.

Block 320 identifies event sequence segments S1={a, b, c, d}, S2={e, f, g} and S3={h, i} which are obtained from the threads. The sets of events 304 and 312 are the same (the same event appears twice), and are used to provide SI. The set of events 306 appears once and is used to provide S2. The set of events 314 appears once and is used to provide S3. At step 330, a recurring event detection algorithm is applied to the event sequence segment. A result of step 330 is a recurring event sequence 340, namely FS1={a, b, c, d}.

Since our goal is to identify rules that correspond to predicable control flows, we separate the events at the thread level. Furthermore, we found events often occur in a bursty manner. Intuitively, events happening close in time tend to be generated by the same code block, while events well apart in time are more likely associated with different code blocks. Thus we further segment per-thread based event sequences into multiple event sequence segments using a time gap threshold (e.g., one second). This threshold can be adjusted and optimized for different systems. For example, in T1 302, events d and e may be more than one second apart, indicating that they should not be grouped. However, a, b, c and d may be less than one second apart from one another, indicating that they should be grouped. Also, e, f and g may be less than one second apart from one another, indicating that they should be grouped. Similarly, in T2 310, events d and h may be more than one second apart, indicating that they should not be grouped. However, a, b, c and d may be less than one second apart from one another, indicating that they should be grouped. Also, h and i may be less than one second apart from one another, indicating that they should be grouped.

To efficiently identify recurring event sequences from the segments, the recurring event detection algorithm at step 330 may adopt the previously-mentioned Sequitur algorithm, in one possible implementation. However, other approaches for finding recurring sequences may be used as well. Given a sequence of symbols, the Sequitur algorithm identifies repeated patterns and generates a set of grammar rules to hierarchically represent the sequence. Sequitur has a linear time complexity and can read one pass of data in streaming mode. Although it may generate sub-optimal recurring sequences, we found it acceptable in our application as low time complexity is an important goal.

We made two modifications to the default Sequitur algorithm. First, the original algorithm takes only one sequence of symbols as input (in our case, each symbol is a Rabin hash. discussed in the previously-mentioned article by M. O. Rabin). We adapted the algorithm to extract patterns from multiple input event sequence segments concurrently. Second, Sequitur generates hierarchical rules as an output, and in our analysis, we recursively unfold the hierarchical rules to generate flattened (non-hierarchical) event sequences. To ensure each learned sequence is not too short, we select a flattened event sequence only if its length is above a pre-defined length threshold (e.g., set to four events in an example implementation), and its sequence is above a pre-defined recurrence threshold (set to five events in an example implementation). Typically a length greater than one is of interest. We call the recurrence of an event sequence, e.g., the number of time it occurs in a given time period, or an absolute number of times it occurs, as its "support." Thus, the support threshold can be the number of observations of an event sequence so far. For example, certain programs might run only occasionally and certain events might only occur occasionally. If we limit the observations to a certain time period, we might not get a high enough count of the sequence for relatively rare events. Even if a lot of time has passed, a rule can still apply. So, the support threshold can be an absolute number.

For example, the group 314 of events h, i in FIG. 3a is not considered to be a recurring event sequence since the length is two events, below the threshold of four events. In contrast, the groups 304 and 312 meet the minimum length of four events.

FIG. 3b depicts a process for generating hierarchical grammar rules from an event sequence. The process provides a hierarchical sequence which represents a sequence of the events in a compressed form by symbols, where, typically, some of the symbols represent multiple events and other symbols represent single events. In further detail, the Sequitur algorithm forms a grammar from a sequence based on repeated phrases in that sequence. Each repetition gives rise to a rule in the grammar, and the repeated subsequence is replaced by a symbol, producing a more concise representation of the overall sequence. The grammar requires that no pair of adjacent symbols appears more than once in the grammar (digram uniqueness), and every rule is used more than once (rule utility). These two constraints exactly characterize the grammars that the Sequitur algorithm generates.

Depicted are the grammars that result when successive symbols of the sequence "abcdbcabcd" are processed (where each symbol represents a unique identifier of an event, for instance). The first column provides a symbol number. The second column shows the sequence observed so far, the third column gives the grammar created from the sequence, and the fourth column notes constraints that have been violated, and actions that are taken to resolve the violations. When the Sequitur algorithm adds the final c at symbol 6, the digram bc appears twice. The Sequitur algorithm creates the new rule A, with bc as its right-hand side, and replaces the two occurrences of bc by A. This illustrates the basic procedure for dealing with duplicate digrams.

The appearance of a duplicate digram does not always result in a new rule. If the new digram appears as the right-hand side of an existing rule, then no new rule need be created: the non-terminal symbol that heads the existing rule replaces the digram. After symbol 9 in Table 1, a third bc appears, and the existing non-terminal symbol A replaces the third occurrence of bc. This results in a new pair of repeating digrams, aA, shown in the next line. The Sequitur algorithm accordingly forms a new rule B, which replaces the two occurrences of aA. The Sequitur algorithm creates and maintains the hierarchy by an iterative process: the substitution of A for bc results in the new digram aA, which is itself replaced by B. For larger sequences, these changes ripple through the grammar, forming and matching longer rules higher in the hierarchy.

The final grammar is represented by the sequence S→CAC, where A→bc and C→aAd. S is the highest level of the hierarchy, A is the next lower level and C is the next lower level. To recursively unfold the hierarchical rules to generate a flattened event sequence, we note that sequence S is composed of sequences C and A. A flattened event sequence is one which does not have a symbol which represents other symbols. That is, it is a non-hierarchical sequence which only has event symbols, e.g., symbols which represent single events but not multiple events. We observe that C→aAd is a hierarchical representation because A represents bc. With bc substituted for A, we have C→abcd, which is a flat event sequence. This event sequence is a candidate to become a recurring event sequence if it meets other criteria, such as length and recurrence thresholds. We store the recurring sequences of events in memory for comparison against other events in an automatic error detection process.

Figure 3C:
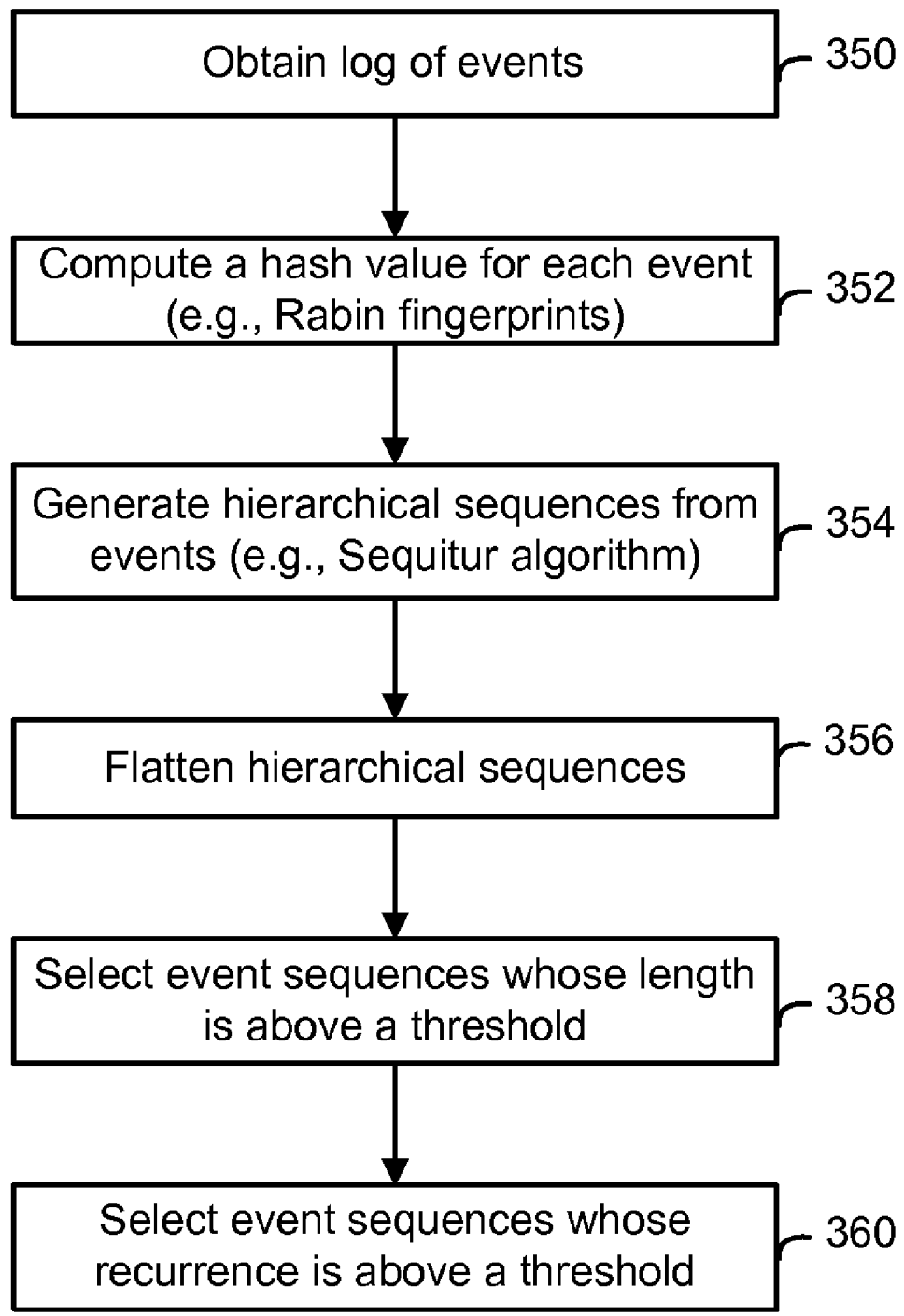
FIG. 3c depicts a process for identifying recurring event sequences from hierarchical grammar rules.

FIG. 3c depicts a process for identifying recurring event sequences from hierarchical grammar rules, and provides details regarding step 210 of FIG. 2. Step 350 includes obtaining a log of events, such as in the learning process. For example, the administrator laptop 140 of FIG. 1 can obtain events logs from other computer via a push or pull model. The administrator laptop 140 may include appropriate software processes and processing and memory resources for performing the tasks herein, in one possible approach. Step 352 includes computing a hash value for each event, such as by using Rabin fingerprints. Step 354 includes generating a hierarchical sequence from the events, such as by using the Sequitur algorithm. Step 356 includes flattening the hierarchical sequence. Step 358 includes selecting event sequences whose length (number of events) is above a threshold. Step 360 includes selecting event sequences whose recurrence is above a threshold. These recurring sequences of events can be stored in memory for subsequent comparison against other events in an automatic error detection process. Steps 358 and 360 may be considered to be filtering steps for filtering a pool of all candidate event sequences.

4.2 Event Trie Construction

After we generate the flattened recurring event sequences from input events, we proceed to construct an event trie (step 212 of FIG. 2) in the form of a prefix tree to store all the recurring sequences. FIG. 4a shows the construction of an example trie based on identified recurring event sequences, and identifying rule edges of the trie. In a trie, each node represents a registry key access event, and each directed edge represents the transition between the corresponding two events in temporal order. Generally, a trie, or prefix tree, is an ordered tree data structure that is used to store an associative array where the keys are usually strings. The position of a node in the tree shows what key the node is associated with. All the descendants of a node have a common prefix of the string associated with that node.

The use of a trie representation serves a couple of important purposes. First, it represents the temporal transition relationships between different events, providing the base for deriving event transition rules. Second, we found that many recurring event sequences have common prefixes. Hence the prefix tree structure explicates the divergence of different event paths from a single point.

Given that each process class builds a trie for deriving rules, we can further optimize the trie data structure to make it more compact. An observation is that many event sequences share suffixes as well. In majority of these cases, the two corresponding sequences also have similar or common prefixes, but their event sequences segments in the middle are different. We suspect these differences may be caused by different configurations or input parameters under the same control flows. In practice, merging common suffixes is very effective in reducing the trie sizes (on average 5-6 times). Meanwhile, this optimization still preserves the event transition relationship to ensure the rule derivation correctness. See also FIG. 4c.

Note that the use of a trie is one example implementation for representing rules based on recurring event sequences. Other data structures including other ordered tree data structures such as binary trees, may be used as well.

4.3 Rule Derivation

With a trie available, we proceed to derive event transition rules that all threads in a running process have to follow. Recall that every node in a trie represents a unique event, and every edge represents a transition. Therefore, our approach is to identify those event transitions a→b that are deterministic given the sequence of events from root to a that happened so far. We define such an edge as a rule edge. Clearly, only edges from a node with only one outgoing edge are rule edge candidates.

In FIG. 4a, example recurring event sequences 400 include FS1={a, b, c, d}, FS2={a, b, e, f} and FS3={b, c, d}, are used to build a trie 402. Note that these event sequences are not necessarily related to prior examples herein. The trie 402 includes a root node (r) 410. Nodes 412, 414, 416 and 418 are provided for events a, b, c and d, respectively, of FS1, in accordance with the order of the events. Nodes 412, 414, 420 and 422 are provided for events a, b, e and f, respectively, of FS2. Nodes 412 and 414 are common to FS1 and FS2. Nodes 424, 426 and 428 are provided for events b, c and d, respectively, of FS3. Thus, the trie 402 represents FS1, FS2 and FS3.

Initially, we mark every edge in a trie as a rule edge, and if a node has more than one outgoing edge, we un-mark all these outgoing edges. A rule edge is represented as a solid arrow, while a dashed arrow represents a non-rule edge. For example, node 412 has one outgoing edge so it is a rule edge, and node 414 has two outgoing edges so it is a non-rule edge. The edges are the transitions between nodes which are represented by arrows.

To further confirm a rule edge is truly a deterministic transition, we match the current observed event sequence segments against this trie. During the marking process, every time a new event comes in, or at other specified times such as periodic intervals, we will match the context of this event (i.e., events that happened before this current event) into the trie, and confirm that the arrival of the current event is not violating a transition marked as rule. If there is a violation, we unmark that transition since the current event is a violation. In FIG. 4a, the input event stream contains a new recurring event sequence FS4={a, b, c, e}. This sequence is inconsistent with the trie since nodes 416 and 418, and nodes 426 and 428, indicate that event c is followed by event d, not e. As a result, we mark the trie edges by deleting the edges between nodes 416 and 418, and between 426 and 428, as indicated by the "X" marks and changing the edges from solid to dashed lines, in the trie 404.

Also, it is possible to expire rules which are no longer used, after a specified period of time. For example, there might be a programming update which causes the rules to change, so that some existing rules are no longer used. We can keep track of the last time that a rule was used and, if it is longer than a specified threshold, the rule can be deleted. This might involve, e.g., maintaining data with a rule identification and a time of last use based on a timestamp.

The rules are generated based on sets of successive nodes (in successive levels of the trie) in the trie which are connected by rule edge transitions. For example, nodes 412 and 414 are connected by a rule edge transition, thus defining a candidate rule a, b. Nodes 420 and 422 are connected by a rule edge transition, thus defining a candidate rule e, f. Nodes 424 and 426 are connected by a rule edge transition, thus defining a candidate rule b, c. The candidate rules are subject to other criteria such as a minimum length. The trie here provides a simplified illustration. In practice, a trie will have many nodes and branches, and more than two nodes can be connected by rule edge transitions FIG. 4b depicts a trie edge marking algorithm. Example pseudo-code is provided for the rule edge marking process. We consider the sequence of events arrival in thread level to maximum capture of the predictable control flow semantic of the program. However, the events can be from one or more threads. For example, analyzing events from multiple related threads of a process can be useful. Line 1 of the code provides the parent node name of the current event. "nodeQueue" is a queue where each element is a node of the trie. This is used for recursive traversing of the trie. A queue is a data structure that includes all the nodes of the trie. "threadID" is a thread identifier that indicates the thread that an event belongs to. All matching and analysis can be done at the thread level, which most faithfully follows the program execution logic. We start at the top at a parent node and work our way down to child nodes.

Lines 3 and 4 indicate that an event from a thread is not included in the parent node, such as node 410 in FIG. 4a. Lines 5-7 indicate that if the current event matches a child node, then the child node is added to the queue and an edge from the parent node to the child node is marked. Otherwise, if the current event does not match the child node, the edge from the parent node to the child node is unmarked, at lines 8-10. The process is repeated recursively for each lower child level until the lowest child level is reached, such as from node 410 to 412 to 414 to 416 to 418, for event sequence FS1. Next, event sequence FS2 is processed, from node 410 to 412 to 414 to 420 to 422. Next, event sequence FS3 is processed, from node 410 to 424 to 426 to 428.

Lines 13-16 indicate that the trie edge marking algorithm can also proceed from the lowest child node level to merge common suffixes, as mentioned previously. This is depicted in FIG. 4c, where the trie 440 is replaced by the trie 460. Specifically, trie 440 represents a recurring event sequence a, b, c, e by nodes 444, 446, 448, 450, respectively, and a recurring event sequence a, b, d, e by nodes 444, 446, 452, 454, respectively, under a root node 442. Child nodes 450 and 454, both representing the same event e, are present in both recurring event sequences, and can be merged to one child node 450. In this case, the suffix of event e for the recurring event sequences is merged. As mentioned, this provides a more compact notation.

5. Configuration Error Detection and Diagnosis

This section describes how to detect and diagnose configuration errors using the learned rules. Although the configuration access rules are conceptually expressed as a set of event sequence transitions, in practice, we can adopt the learned rule trie as the data structure for detection. In particular, the marked rule edges conveniently describe the deterministic state transitions based on the corresponding event context.

The detection process is similar to the algorithm described in FIG. 4b, only now when we see a violation, in addition to marking the edge as no longer representing a rule transition, we also flag a warning.

However, due to the potentially noisy nature of the registry, for instance, merely adopting this approach for detection tends to result in a high false positive rate (hundreds of alarms per minute). Another option is to increase the support threshold in rule learning to reduce false positives, but raising it too high will likely cause false negatives. And even if we increase the threshold to more than a hundred, there are still tens of alarms per minutes, in some test results. This is not surprising given the huge volumes of registry events and their noisy nature.

The key to reduce the false positive rate is to understand the nature of those false positive events and detect the differences between a true error and a false alarm. Due to the nature of persistency of configuration data, an error should be some persistent change of a registry state. Any violation that demonstrates only a temporary pattern is likely to be noise.

Given this observation, instead of adjusting the support threshold, we can check each violation against false positive suppression policies to see whether the violation demonstrates any volatile pattern. We found the use of these policies is effective in reducing the false alarms, yet not affecting the error detection capability at all (see Section 7).

A first false positive suppression policy is a violation-consistency policy, in which we check whether the violated rules are consistently violated within a short amount of time after they are first violated. The optimal amount of time can be defined by testing. In implementation, a delay of one second was used. The intuition is: if a rule has been both followed and violated in turn in a short amount of time, this indicates the violation is not persistent, and that we should treat it as false positive. This policy can be implemented using a delay buffer (set to a delay of, e.g., one second) to hold the current alarm and not report it until further conformation.

A second false positive suppression policy is an expected event disappearance policy. In addition to the previous policy, on a rule violation, we also check if the expected event (the event that did not appear, where the violating event appeared instead) ever appears in the future for a certain time interval (e.g., set to one second). If it appears in this timeframe, we suppress the alarm and treat it as a false positive. The reasoning behind this policy is that if the registry key corresponding to the expected event was indeed corrupted, it should be persistent and not appear again.

The error diagnosis process involves aggregating alarms, examining the root cause, and recovering the correct registry states. We observed that the corruption of a WINDOWS' registry entry typically will trigger a series of alarms as multiple control flows might be affected by the erroneous configuration state. These alarms are very bursty in time. So instead of outputting all of the alarms for diagnosis, we aggregate all the alarms raised in a specified time period, e.g., one second, and focus on the first alarm during this period to examine root causes.

With both the expected event and the actual observed event (i.e., the violating event) available for a rule violation, diagnosing root causes and even automatic error recovery is possible. We compare the registry entries associated with both events, and perform a number of simple checks. For example, if the registry key accessed by the expected event has been deleted or modified, we can search back in time (assuming registry events are also logged) and identify which process has modified the key. We can also compare the expected registry key states with the current registry key states, and restore the key and its relevant data fields to the expected values.

6. Case Study

In this section, we present two case studies to demonstrate how we detect and diagnose configuration errors, using real world user-reported errors. The first case involves the modification of registry data. The second case involves an error which is caused by deletion of a registry key and all of its subkeys. Many of the registry key corruptions are similar to these two categories.

6.1 Explorer Double Click Error

Figure 5:
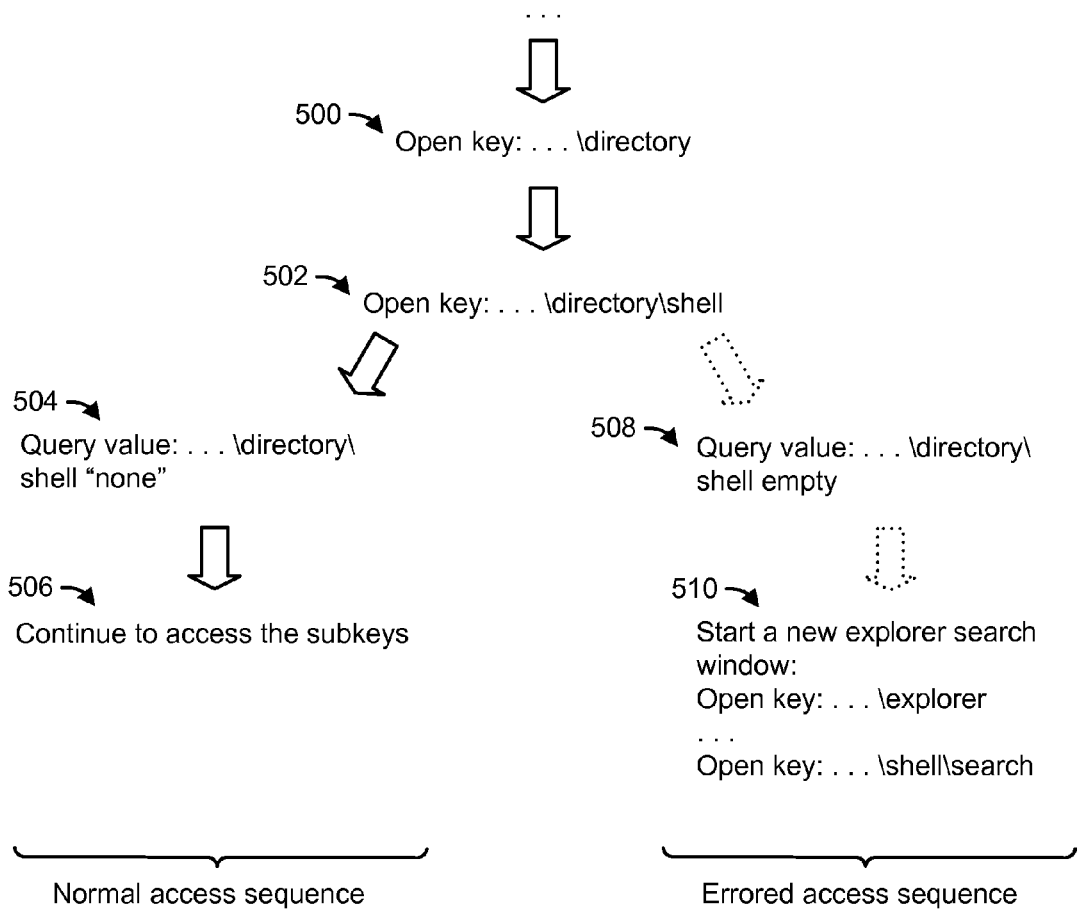
FIG. 5 depicts a first case study of normal and errored access sequences.

FIG. 5 depicts a first case study of normal and errored access sequences. The first error is caused by a bug in the explorer.exe process, which manages the WINDOWS's graphic user interface's appearance. The explorer.exe file is an executable file which provides a GUI to navigate or browse files. The file is executed when the user double-clicks on the "My Computer" desktop icon, for instance. By default, when the user double clicks on a folder, explorer.exe should go into the folder and list the contents (step 500 and 502). However, a specific sequence of clicks from the menu bar causes the directory listing to disappear; instead a search popup window appears, and the user cannot proceed with normal file navigation.

The root cause of the error is a software fault in explorer.exe, where after the specific click sequence, explorer.exe will erroneously modify the "default" value of the registry key "\registry \machine\software\classes\Directory\shell" from "none" (step 504) to empty (step 508). The solution is to manually change this value back to "none."

However, this error happens in a specific context of registry events. In normal execution, when a user double clicks on a folder, explorer.exe will perform a series of registry lookups to determine how to display contents (e.g., icon size, file extensions). Whenever explore.exe opens the above-mentioned registry key during its execution and finds the data of "none," (step 504) it will continue to access its subkeys (step 506). The corresponding registry event sequence was captured as a configuration access rule with context length of 469 events.

When a user inadvertently changes this registry value, instead of accessing the subkeys as in the case of normal execution, explorer.exe will open the following two different registry keys: "\registry\machine\software\ classes\Directory\explorer," and "\registry\machine\ software\classes\Directory\search," (step 510) which corresponds to the search window popup.

Given that the deviation is preceded by a certain context, we can successfully detect the configuration errors. Referring to FIG. 5, the registry access trace is simplified for illustrative purpose. The solid arrows indicates the normal registry access pattern which was learned as a rule from the techniques discussed previously, and the dotted arrows are the error access patterns, in response to which an alarm will be set indicating that a rule has been violated.

6.2 Advanced option error

Figure 6:
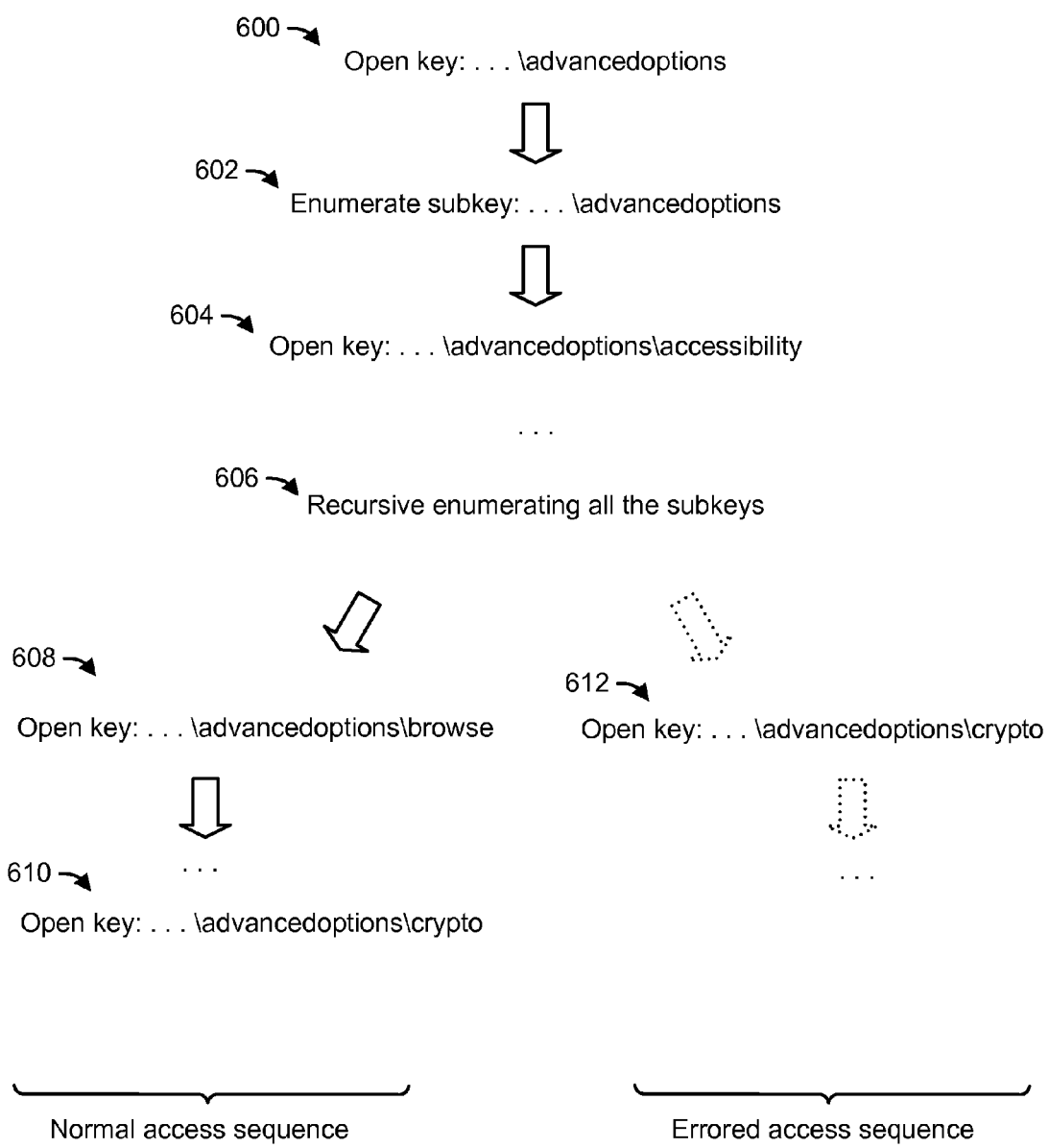
FIG. 6 depicts a second case study of normal and errored access sequences.

FIG. 6 depicts a second case study of normal and errored access sequences. This case study demonstrates how to detect an error caused by permanent registry key deletion. In this example, the error was caused by the deletion of the key "\registry\machine\software\microsoft\internetexplorer\ advancedoptions\browse" and all its subkeys. This key stores all the web browsing settings (e.g., whether to enable script debugging) in INTERNET EXPLORER (IE) under the "Advanced" tab. Deletion of this key would cause a sub tab under the "Advanced" tab to simply disappear.

This demonstrates how we catch the advanced option error. The registry access trace is simplified for illustrative purpose. The solid arrows indicates the normal registry access pattern which was learned as a rule from the techniques discussed previously, and the dotted arrows are the error access patterns, in response to which an alarm will be flagged indicating that a rule has been violated.

Again, the deleted key is accessed in a certain context. Specifically, every time a user clicks the "Advanced" tab, IE access a sequence of registry keys and subkeys related to the "\advancedoptions" key, as shown at steps 600, 602, 604 and 606. Note that not all of the key is shown. In the presence of the bug, when IE tries to access the deleted key, it results in a deviating behavior. Instead of proceeding to access " . . . /advancedoptions/browse" (step 608) before accessing another subkey " . . . /advancedoptions/crypto" (step 610), it accesses the subkey " . . . /advancedoptions/crypto" directly (612). We would detect this as a violation.

Although in this example, we successfully detect the deletion of a subkey, we can also detect a key that a program can directly access without accessing its parent key, as long as the key access event happens in a certain context which is captured by the rules. We have confirmed this by deleting the top level " . . . \advancedoptions" key and successfully captured this error too.

7. Experiment Evaluation

We performed a series of experiments to evaluate the effectiveness and performance of our tool, including testing it with reproduced real-world bugs, random registry key corruptions, and month-long registry event traces collected from twelve actively-used machines. To monitor all the registry access events from a machine, we installed the Flight Data Record (FDR) tool on both user desktops and servers, and used the collected traces to serve as inputs to the process. FDR is discussed in C. Verbowski et al., "Experience Talk: FDR: A Flight Data Recorder Using Blackbox Analysis Of Persistent State Changes For Managing Change And Configuration," LISA '04: Proceedings of the 18th USENIX conference on System administration, page 1, Berkeley, Calif. 2004, incorporated herein by reference. The FDR project provides an infrastructure to monitor and collect all registry key and file system access events of a large number of machines. The focus is on efficiently collecting data and compactly storing them in a few centralized servers, while we focus on the analysis of the events after they are collected.

Next, we first measure in Section 7.1 the event coverage ratio by the learned rules over time, and the corresponding trie size growth, to motivate that we effectively reduce the complexity of configuration event logs. In Section 7.2, we evaluate the detection capability in finding real configuration errors, where we manually reproduced ten real user reported bugs on a set of five user desktops with different OS and application configurations. Section 7.3 further examines the coverage of our tool in detecting errors involving large amount of registry keys. In particular, we exhaustively corrupted every registry key that a process accessed, and applied our tool to see whether it is able to capture each corruption in this extreme case. To have a practical online troubleshooting tool, we need to keep our tool at a low false positive rate. In Section 7.4, we measure the number of alarms generated on a daily basis by applying the tool to month-long FDR logs collected from a cluster of eight servers and four user desktop machines.

7.1 Event Coverage and Trie Sizes

This section examines the percentage of all registry events covered by learned rules. Our evaluation leverages the registry event logs collected by the FDR framework, and we run our tool by reading events from the logs in time order, simulating online error detection and diagnosis. Our experiment data include logs from eight server machines and four user desktops.

Figure 7:
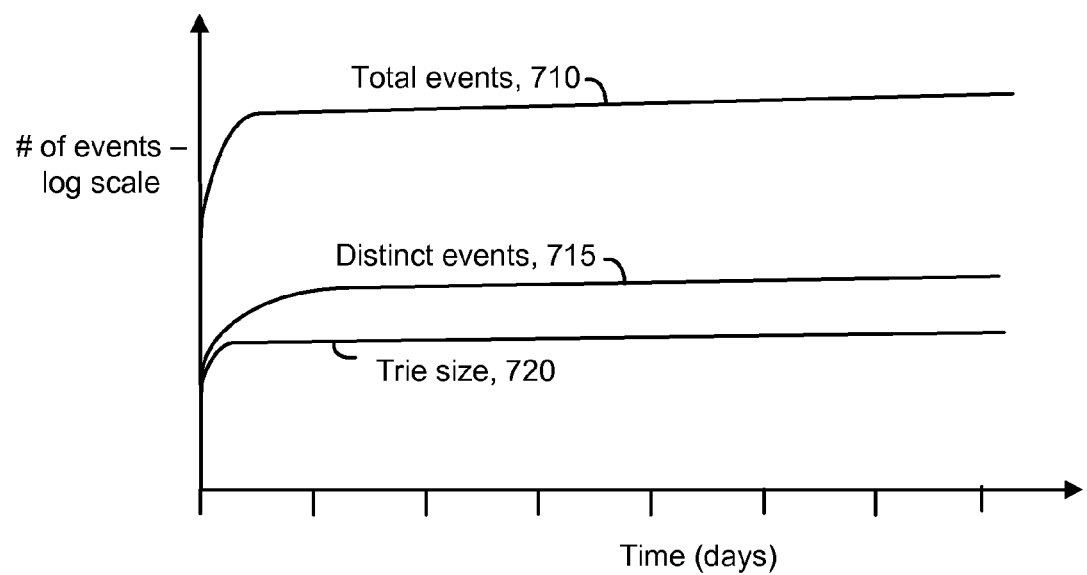
FIG. 7 shows the growth of the number of all events for the process "iexplorer.exe" running on a desktop.
Figure 8:
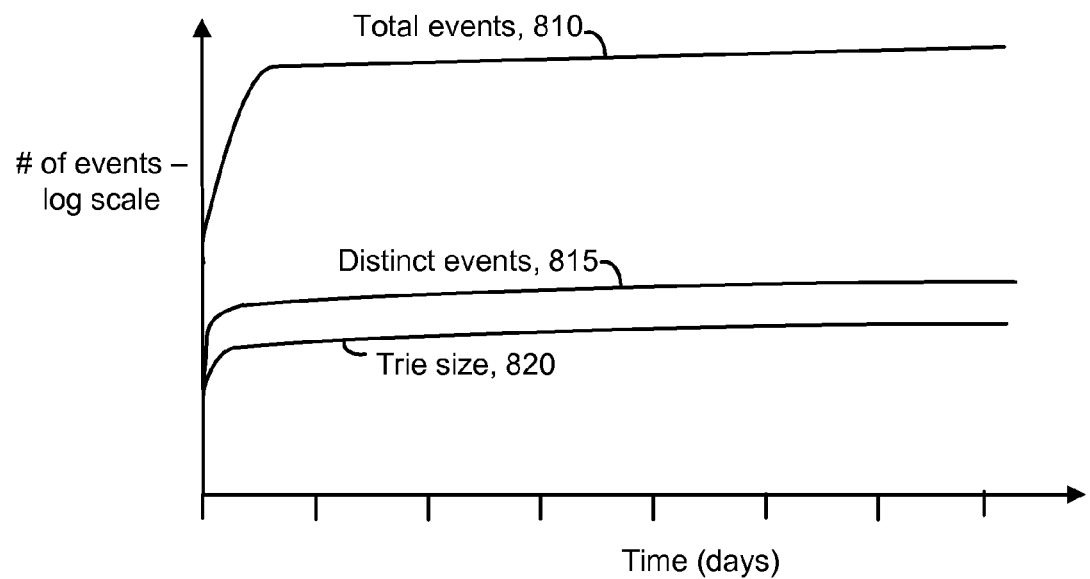
FIG. 8 shows the growth of the number of all events for the process "services.exe" running on a production server.

FIG. 7 shows the growth in the number of all events for the process "iexplorer.exe" running on a desktop, while FIG. 8 shows the growth in the number of all events for the process "services.exe" running on a production server. "iexplorer.exe" is a process belonging to the AdClicker advertising program. This process monitors a user's browsing habits and distributes the data back to the author's servers for analysis. This also prompts advertising popups. "services.exe" is a part of the WINDOWS OS and manages the operation of starting and stopping services, such as during the computer's boot-up and shut-down. We choose these two processes as they are the most popular ones with a long active time.

In both figures, the x-axis represents days, e.g., zero to eight days, and the y-axis represents the number of events, on a log base ten scale. In FIG. 7, the total number of events, the number of distinct events, and the trie size (number of nodes in the trie) are represented by curves 710, 715 and 720, respectively. In FIG. 8, the total number of events, the number of distinct events, and the trie size (number of nodes in the trie) are represented by curves 810, 815 and 820, respectively.

Figure 9:
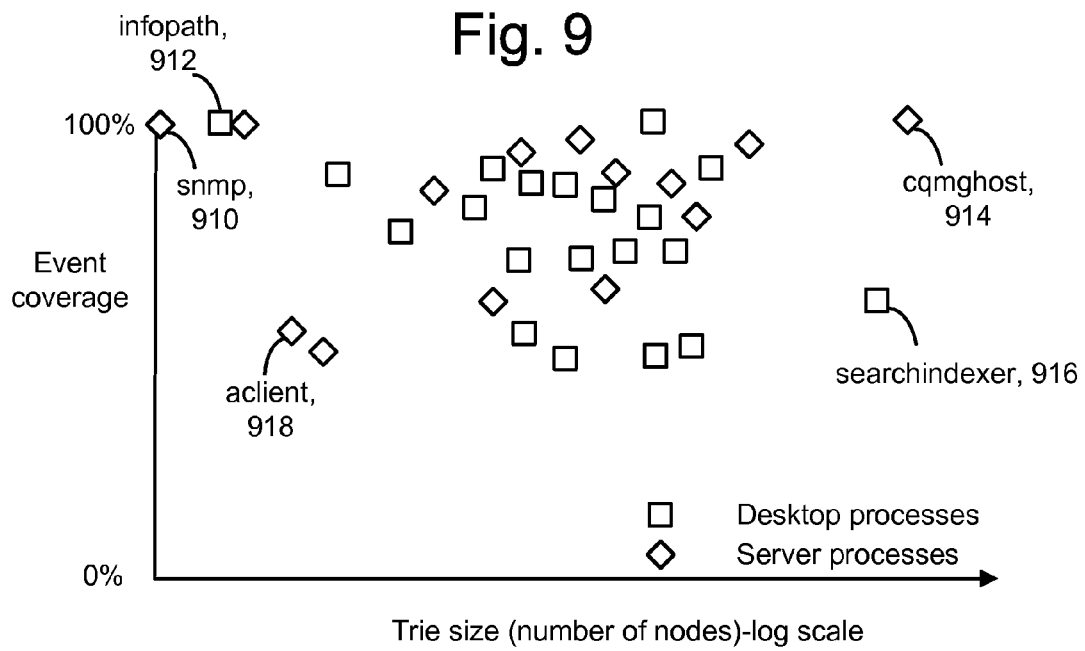
FIG. 9 depicts event coverage vs. rule trie size for two different machines, one a user desktop and one a production server.

For both processes, the trie sizes are several orders of magnitude smaller than the total number of events, and their growth slowly converges during the course of the seven day period in the figures. Compared to the number of distinct events, the trie sizes are also considerably smaller (up to an order of magnitude). These two observations demonstrate the effectiveness in complexity reduction by using a compact trie data structure to summarize the registry event access patterns. We proceed to examine the event coverage of the rules vs. the trie size for different processes on both desktops and servers in FIG. 9. FIG. 9 depicts event coverage vs. rule trie size for two different machines, one a user desktop and one a production server. Only those processes with at least 1 million events are plotted. The x-axis represents the trie size (number of nodes in the trie) and the y-axis represents the event coverage on a scale of 0-100%, that is, the percentage of all possible events of a process which are represented, e.g., covered, by an associated trie. The squares represent data from various desktop process, while the diamonds represent data from various server processes. Additionally, a few of the processes are specified, namely "snmp" (910), "infopath" (912), "aclient" (918), "cqmghost" (914) and "searchindex" (916). In FIGS. 9-11 and 13a-14, the file name suffix ".exe", representing an executable file, is not depicted for conciseness. "snmp" ("snmp.exe") is a network process which allows for the configuration of LAN infrastructure components. "infopath" is a process associated with MICROSOFT OFFICE INFOPATH electronic forms application. "aclient" is an ALTIRIS Client Agent for WINDOWS. "cqmghost" is a Foundation Agent Service from HEWLETT-PACKARD COMPANY. "searchindexer" is a service belonging to WINDOWS VISTA client OS.

For a majority of the processes, their trie sizes are on the order of hundreds to tens of thousands of events for summarizing the predictable configuration access patterns. Here, the coverage of a process roughly tracks the predicability of its event sequences, or the degree of noisiness of this process. We found that most of the processes are very predictable, with a few exceptions. In particular, the snmp.exe process at the server is highly predictable, where only 27 prefixes in the trie can compactly represent 99.77% of all its registry access events without losing their temporal order.

Figure 10:
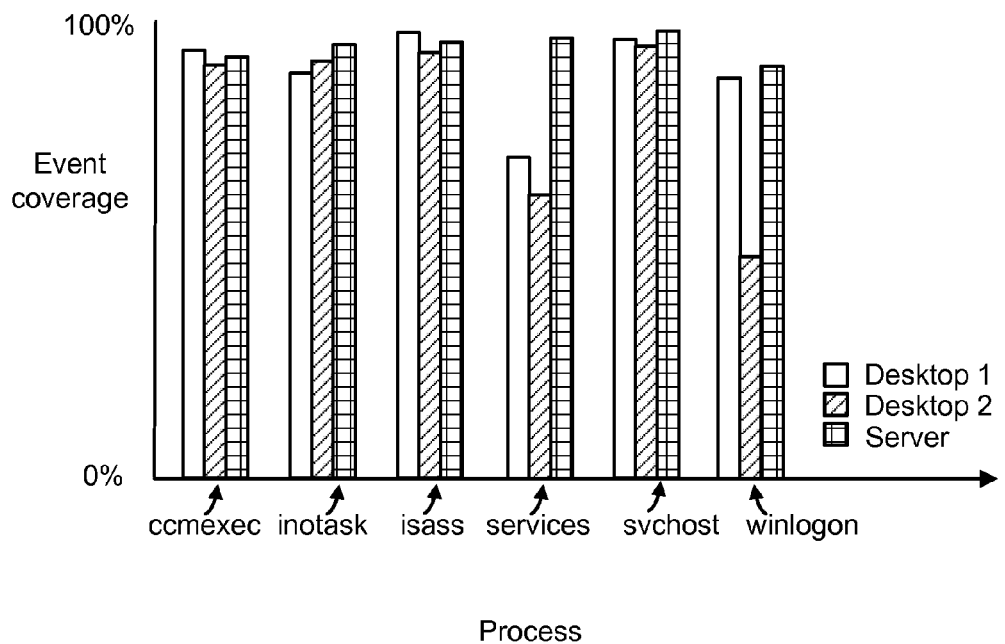
FIG. 10 depicts the event coverage of six common processes across three different machines.

We are interested in whether the high coverage is similar across different machines. FIG. 10 shows the coverage of six common processes that were all observed at two different desktops and one production server. The x-axis depicts different processes, and the y-axis depicts an event coverage percentage. The event coverage is provided for the same process running on two different desktops, desktop 1 and desktop 2, and on a server. The process "ccmexec" is a part of the MICROSOFT Short Message Service (SMS) OS service. "inotask" is a part of the ETRUST ANTIVIRUS/INOCULATEIT suite from COMPUTER ASSOCIATES, and is used to schedule scans and signature updates. "isass" is registered as the OPTIX.PRO virus which is a configurable remote access tool which has the ability to disable firewalls and local security protections, and a backdoor capability. "services" is a process that is responsible for starting all the WINDOWS NT Service processes (background processes) in the OS (similar to cron on Unixj). "svchost" is the Generic Host Process for Win32 Services used for administering 16-bit-based dynamically linked library files (DLL files) including other supplementary support applications. The "winlogon" process belongs to the WINDOWS login manager.

Among the six processes, four of them have consistent behavior among the different machines (namely ccmexec, inotask, isass and svchost) in that the event coverage is at a similar level. For the remaining two processes (services and winlogon), we observe a larger coverage when the process ran on the server than on the desktop. In particular, one of the two processes, is "services.exe," mentioned above. Since user desktops tend to have more diversified applications than production servers, the activity patterns of services.exe are also likely to be noisier and less predicable, reflected by the lower coverage.

Figures 11, 12A:
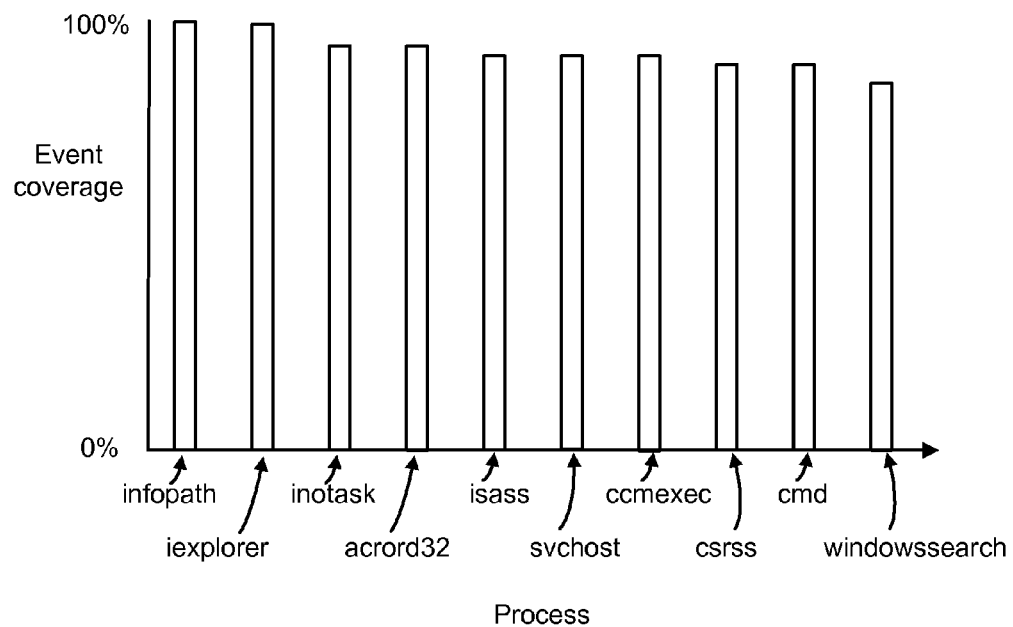
FIG. 11 depicts the top ten processes with the largest event coverage in a user desktop.
FIG. 12a depicts detection results of reproduced real errors.

FIG. 11 depicts the top ten processes with the largest event coverage in a user desktop. These are processes for which the configuration error detection process described herein works most effectively, since their patterns are very stable and predictable. "acrord" is the ADOBE ACROBAT READER. The MICROSOFT Client Server Runtime Server subsystem use the process "csrss.exe" to manage the majority of the graphical instruction sets under the WINDOWS OS. "cmd" allows access to the WINDOWS Command Prompt, also known as MICROSOFT DOS. The "windowssearch" process associated with the WINDOWS Desktop Search Tray from Microsoft, and is used by the MSN Search Toolbar.

7.2 Detection Of Real Errors

We manually reproduced ten real user reported errors on a set of five desktop machines (one was a virtual machine). The only criteria we used in selecting these cases are whether they have known root causes for our evaluation and the feasibility of reproducing the same application failures (as some errors require a special hardware setup or specific software versions to reproduce). The error reproduction process exactly follows the set of user actions that trigger the software failures. FIG. 12a depicts detection results of reproduced real errors.

The first row is the OS and INTERNET EXPLORER version. The first number in each column is the rank of the root cause key in our reported alarms, and the second number is the total number of alarms we report. NA means we couldn't reproduce that error on that machine, and—is the case that was not observed. The names of the errors and a description are provided below.

Doubleclick: When double clicking any folder in explorer, "Search Result" window pops up.
Advanced: IE advanced options missing tabs.
IE Search: Search dialog will always be on the left panel of IE and can't be closed.
Brandbitmap: The animated IE logo disappears.
Title: IE title changed to some arbitrary strings.
Explorer Policy: Windows' start menu becomes blank.
Shortcut: In IE, clicking the shortcut to a file no longer works.
Password: IE can no longer remember the user's password.
IE Offline: IE would launch in offline mode and user's homepage can't be displayed.
Outlook empty trash: Outlook asks to permanently delete all items in the Deleted Items folder every time it exits.

Still, not all these errors can be reproduced on all the machines, and out of all combinations, we were able to reproduce forty one cases. For each machine, the ten errors were reproduced one by one with a longer interval between them (several hours). Among the total reproduced errors, we successfully captured forty of them and missed only one case. In each entry of FIG. 12a, the second number shows the total number of alarms we generated (alarms are aggregated as described in Section 5) during the interval of two consecutive error reproduces. The first number is the ranking of the root cause key among all the alarms, which is simply the sequential number of the alarm. In all successful detection cases, the root cause key is always in the first alarm reported (even before alarm aggregation) if there were multiple alarms. For example, the third row of data, under "Server 03, IE 6" has an entry "1/10," and is for the error "IE search." This means the root cause key has a rank of "1" and the total number of alarms is "10."

Other than the root cause alarm, the remaining alarms we generated within the same interval are not random false positives. In fact they were also caused by the same configuration error. For example, in the case of the "Outlook Empty Trash" error, once the value of the registry key "\registry . . . \office\11.0\outlook\preferences\emptytrash" is set to 1, there will be an alert window popping up every time upon the exit of OUTLOOK, asking whether to permanently delete all items in the Deleted Items folder. We will catch this root cause key immediately when OUTLOOK accesses this changed key. In addition to that, we will also report another rule violation involving registry key "\registry . . . \office\11.0\outlook\common\alerts" because there will be an alert window popping up, which never happened before.

The only missed key case is because of the rule we learned was overfitting. In particular, the event associated with the root cause key is buried deep in a long rule, and when the error happens, its context, in terms of the preceding event sequence, simply didn't appear at all. We suspect in this case, there might exist two different program flows, both leading to the access of the root-cause key. But during our learning process we only observe one of the two paths as context.

7.3 Detect Random Key Corruptions

We further evaluate the effectiveness of our tool in terms of capturing errors in an extreme environment. To do so, we deleted every registry key that a program repeatedly accessed one after another, and see whether our tool could catch it. By frequent, we mean any key that IE accessed more than twice during a time range of several hours. Two is the lowest threshold we can choose to create most noisy environments for the tool, since one is no longer frequent. We also chose the corruption model as to delete the key and all its subkeys, instead of changing the value or data, since as we have discussed, key deletion is most challenging to detect.

In this experiment, we chose INTERNET EXPLORER (IE), the most popular process on desktop machines, and conducted the experiment on a virtual machine with WINDOWS XP SP3. We periodically launched IE every twenty seconds, and simulated user-browsing to a randomly selected Web site. After three hours of normal execution, we corrupted every registry key that IE accessed at least twice in its normal execution one by one. Each time, we restored the corrupted registry key forty seconds after it was corrupted before we continue to corrupt the next key. Given the keys may have appeared twice only, using the current support threshold of five for selecting frequent or otherwise recurrent sequences (to construct a trie) may completely miss those keys. So we adjust the support threshold to two. Recall that we call the recurrence of an event sequence as its "support."

Although IE accessed more than thousands of unique frequent keys in the three hours, using regedit.exe, a tool to manage the registry, we could only find 243 of the key three hours later. For the rest, regedit.exe simply returned a "couldn't find" message.

In total, we successfully reported 206 (83%) of the total 247 key corruptions and can pinpoint the root cause as key deletion. Interestingly, the 41 (17%) of missed keys are all related to the following seven unique keys among the 41 of them:

"\registry\machine\software\classes\ftp,"
"\registry\machine\software\classes\news,"
"\registry\machine\software\classes\rlogin,"
"\registry\machine\software\classes\gopher,"
"\registry\machine\software\classes\telnet,"
"\registry\machine\software\classes\tn3270," and
"\registry\machine\software\classes\mailto."

The remaining thirty-three keys are all subkeys under the hierarchy of these seven keys. The registry access pattern for WINDOWS® applications is that the top level keys should be opened first in order for the applications to zoom down to the subkeys. So in the rules of our tool, the top level keys are always in the context of their subkeys. Once we miss the seven high level key corruptions, we will also miss all the subkey corruption cases.

The question is why we missed these seven top level keys. To find the answer, we manually examined event logs and found that the events accessing these keys did not happen in our corruption experiment at all, though they appeared in the normal execution logs. Given the seven keys are all external services that IE integrates, we suspect during the early stage of our key corruption experiment, the key holding the locations of these seven service keys was corrupted. Even after it was restored, the IE behavior still got changed by not accessing these keys. We plan to investigate further and also to perform more extensive evaluation using other processes as future work. Nevertheless, the capability of the tool for successfully detecting and diagnosing the majority of registry keys suggests it is a useful and promising tool for automated software error troubleshooting.

7.4 Number of Alarms on Healthy Logs

To evaluate the false positive rate of our tool, we apply it on "healthy" logs, monitoring all processes, and examining how many alarms are generated. By "healthy" we simply mean that users experienced no software failures or abnormal behavior of the system during the log collection period (learning process) for one or more program executions. We chose one production server cluster of eight machines and four user desktops with different settings, and evaluated one month (30 days) of logs for each machine. The server OS is WINDOWS 2003, and the desktop OSes were listed in FIG. 12b. FIG. 12b depicts a number of alarms for all processes on healthy logs. The first column identifies the server or desktop, the second column identifies the number of processes involved, the third column identifies the number of events per day (in millions) and the fourth column identifies the number of alarms per day.

On average, we will flag 0.8 alarms on server machines and 4.6 alarms on desktop PCs per machine per day. The potential root causes of these alarms could be software updates, configuration setting changes, or normal events that violated rules due to insufficient learning. Desktop processes are far more noisy than server processes, possibly because they are more human interactive. This observation is further validated by examining alarms generated on a per process bases.

Among an average of 32 processes per server machine, only 7 unique processes ever had alarms during the 30 day period. FIG. 13a shows the number of machines that ever generated alarms on each of the seven processes. The x-axis identifies the process and the y-axis identifies the number of alarms per day. Each of the processes has been described previously except for "w3wp" and "MOMservice." "w3wp.exe" is a process associated with an application pool, and "MOMservice" is a service of the MICROSOFT Operations Manager.

FIG. 13b depicts a number of server machines which generate alarms across different processes. The majority of the alarms are due to two processes: "services.exe" and "svchost.exe," and the high alarm rate is consistent across all eight machines. The number of machines is 7, 3, 1, 1 and 1 for "isass," "cqmgserv," "inotask," "MOMservice" and "w3wp," respectively. As described in Section 7.1, services.exe is a process for starting all the NT Service processes. Hence we suspect the higher alarm rate may be due to a variety of different applications that our rules do not capture, especially during the beginning of the tool running. Similarly, svchost.exe is also a generic process for running multiple services in a single process.

Examining the number of alarms over time, we found after our tools runs for 23 days, there are no more alarms reported for the server cluster. 34% of the alarms were indeed in the first three days, and 51% from the first nine days. The alarms also appears to be bursty in time (11 days have no alarms at all), suggesting that they may be all correlated with each other and should be diagnosed together.

Figure 14:
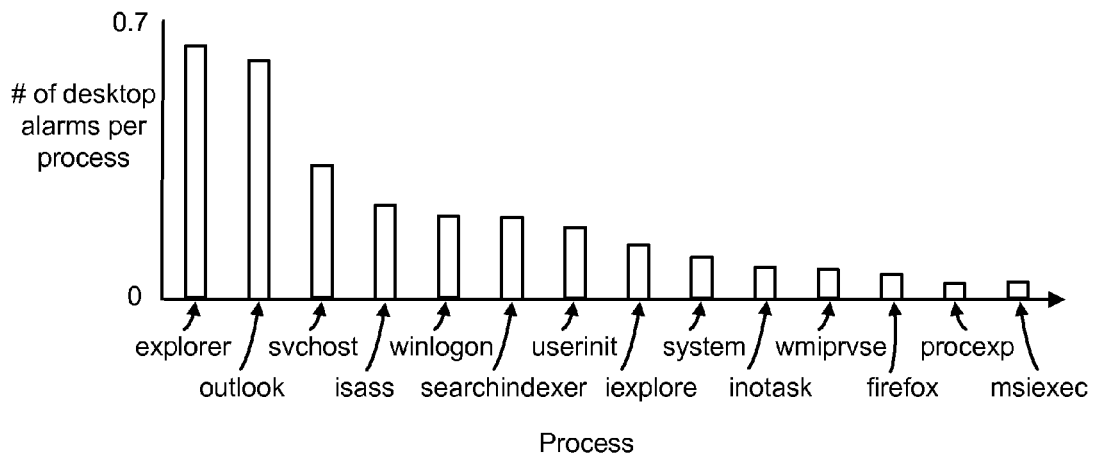
FIG. 14 depicts a number of desktop machines which generate alarms across different processes.

FIG. 14 depicts a number of desktop machines which generate alarms across different processes. The processes which have not already been mentioned are as follows. "outlook" is the main executable of the MICROSOFT OUTLOOK e-mail program. "userinit" is a key process in WINDOWS. On bootup, it manages the different start up sequences needed, such as establishing network connection and starting up the WINDOWS shell. "system" is the core kernel process of WINDOWS. "wmiprvse" is a process of the Windows Management Instrumentation, and is used to develop applications for monitoring purposes. "firefox" is a part of the MOZILLA Internet browsing suite, an alternative to IE. "procexp" is a WINDOWS SYSINTERNALS PROCESS EXPLORER from SYSINTERNALS belonging to PROCESS EXPLORER. This is a tool that displays every process running on a machine and what resources they are using. "msiexec" belongs to the WINDOWS Installer Component and is used to install new programs that use WINDOWS Installer package files (MSI).

For desktop machines, we observe a higher alarm rate per machine per day than servers, in particular for popular interactive processes (e.g., explorer.exe and outlook.exe). These two processes are also the less predictable processes that have relatively low event coverage when matching their events against their rule tries. The process "explorer.exe" manages the user's settings of the desktop appearance, and a change of tool bar position will cause it to modify some registry keys.

For desktop machines, the number of alarms per process isn't proportional to the frequency of registry access. Rather, it depends on the nature of the process. For example, explorer.exe, a process which manages the WINDOWS desktop appearance, is the noisiest process, since it involves a lot of user interaction (e.g., users may frequently change the desktop, menu bar settings, etc.) On the other hand, iexplore.exe, with great more registry accesses than explorer.exe, has much lower alarm rate.

8. Deployment in Server Clusters

One of our goals is to use the tool described herein to automatically monitor and troubleshoot software failures at server farms or data center machines. Toward this goal, the tool can be integrated with the MICROSOFT FDR framework (C. Verbowski et al., mentioned previously). This framework leverages a centralized approach for monitoring and managing large-scale networked computers. It deploys a lightweight client module to every participating host. The client module monitors all registry access events and uploads them periodically to a centralized management server. The registry events are stored in a very compact format and the storage requirement per machine per month is about only 500 MB. Thus, a server with a moderate 4 TB of disk space can store all registry access events for a month for up to 8000 machines. In addition, the uploading traffic will be very small, on average 2MB/sec. aggregated traffic to the server.

The currently FDR deployment includes 2000 hosts uploading for over five years. Among them, on average about 1000 systems are active uploading at any time, with approximately 700 production servers, 200 lab systems, and 100 user desktops. The total number of registry events is more than 20 trillion.

In a general server farm/data center environment, we expect two different deployment models of our tool. First is a local model, where each machine monitors itself for error detection and diagnosis. Only alarms will be aggregated and shipped to a server for software update and maintenance. The advantages of this mode are that it is simple and detects the problem on-site without much network traffic. Second is a centralized model, where a small number of centralized servers monitor an entire data center. This allows us to fully take advantage of the similarities between machines from the same data center.

Since data center machines have roughly similar hardware, software settings and workloads, their configuration access rules should be similar to each other. There are three ways the centralized model can benefit from this similarity, compared to the local model. First is reducing memory overhead. Machines do not need to store redundant rules; one copy at the centralized server suffices. Second is cooperative false positive suppressing. Once a false positive is discovered for one machine, we can suppress the instances of this false positive on other machines. Third is cooperative error detection. By aggregating event logs from all machines, we collect a much larger, unbiased data set, and thus can learn better rules and detect more bugs.

Figure 15:
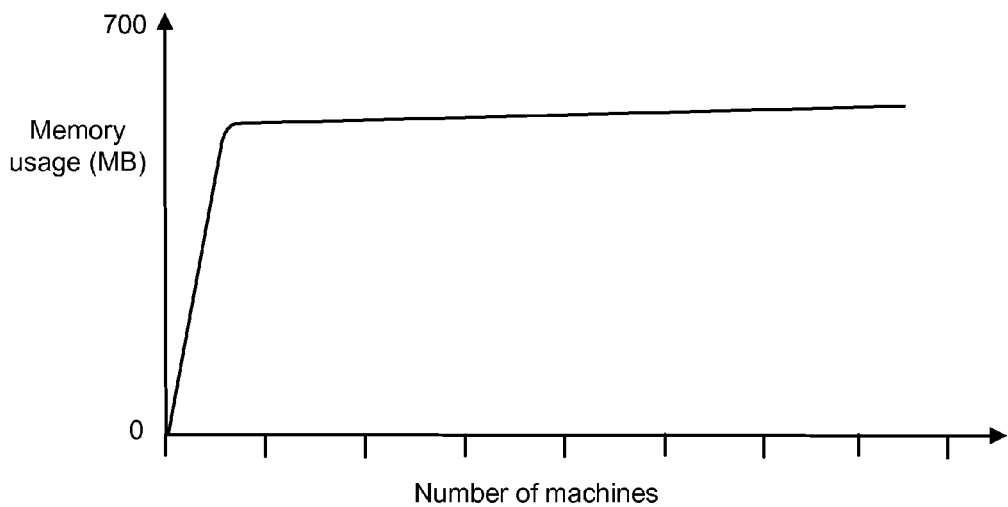
FIG. 15 depicts memory savings due to rule sharing.

We conducted an experiment to show the potential memory savings in the centralized model. FIG. 15 depicts memory savings due to rule sharing. The x-axis depicts a number of computing machines and the y-axis depicts an amount of memory usage in MB.

We used FDR event logs collected from eight WINDOWS LIVE servers; for each machine, we used an 8-hour event log generated by the process "services.exe." These logs are canonicalized to some extent, to remove the differences caused by machine names. An individual machine alone uses 503 MB memory on average. However, in the centralized mode, the incremental memory overhead to add a new machine is only about 13 MB. Thus, ignoring CPU overhead, a server with 16 GB of memory, which is considered to be a moderate amount of memory based on contemporary standards, can potentially monitor more than 1000 machines (since 1000×13 MB<16 GB).

We also roughly computed the CPU overhead of the tool in the centralized model. The tool has an analysis time which is linear to the number of machines. On average, it takes twelve hours to analyze a month's log on one machine, using one core on an ADVANCED MICRO DEVICES (AMD) OPTERON 2.41 GHZ CPU. As a projection, we can keep up with logs from roughly 240 machines, using a four core machine (memory is not the bottleneck, and assuming there is no slow down in disk access speed).

9. Discussion

Regarding false negatives, there are two fundamental assumptions of our context-based error detection approach: (1) an error event must appear after a context (i.e., it is not a stand alone event, and the context refers to a set of ordered preceding events), and (2) the expected event must appear after the context a sufficient number of times, but the error event has never. Thus, our approach, by definition, can not catch bad events whose context has not occurred repeatedly in the learning process.

Regarding program-specific error detection and ranking, as we have seen from the false positive analysis, the noise in event logs varies greatly from program to program—after all, these programs exist for different purposes, and have different workload and usage patterns. We can harness program-specific knowledge to further improve our detection accuracy by: (1) using different parameters (e.g., the support threshold) for different programs, and (2) ranking error reports according to programs. For example, since explorer.exe is far noisier than other programs, we can use a higher support threshold for this program. Also, an error report from system.exe, the core kernel process of WINDOWS, should be treated more seriously than that an error report explorer.exe: the former may indicate a security hole, while the latter typically only affects desktop appearance. Thus, we should rank error reports from system.exe over that from explore.exe. Generally, a priority or weight can be assigned to the different errors.

Regarding canonicalization, the rules that the tool learns may contain machine- specific information (e.g., a machine name). To get the best performance across different machines, it is important that the rules from different machines be canonicalized appropriately (e.g., reduced to the simplest and most significant form possible without loss of generality). This is often a challenging task as it is not easy to identify the common and the machine specific parts of the registry key. Automatic or semi-automatic approaches to canonicalize rules across machines are desirable.

Regarding applications to other event logs, the tool's underlying techniques are general and applicable to other event logs. For example, the technique can be applied to SQL server user request event sequences to detect abnormal user request sequences for anomaly detection. In addition, with proper adaptation, it can be used as a runtime monitoring tool for general software execution.

Above, we presented an online, automatic tool for configuration error detection and diagnosis. It is based on two key observations: (1) event logs are highly repetitive, and (2) event sequences are much more predictable than single events. Based on these observations, we use a context-based analysis that first summarizes massive event logs into a small number of rules, then use these rules as context to monitor future event logs and detect errors. Although we implemented the tool on WINDOWS and used it to detect WINDOWS registry errors, the tool is generally applicable to other operations systems as well. Our results showed: (1) we successfully detect all twelve real world configuration errors, each reproduced in different OS environments, (2) the tool has a low false positive rate when analyzing months long event traces from both user desktops and server farms, and (3) the tool is scalable and can be a practical management tool that is widely deployed at machine clusters. Important aspects of the tool include: 1) using event sequences and temporal order transitions for software mis-configuration error detection on both single computers and across different hosts in computer clusters, 2) efficiently generating recurring event sequences from event logs (such as by adapting the Sequitur algorithm) and constructing event transition rules, and 3) automatic anomaly detection and failure recovery using event transition rules.

Figure 16:
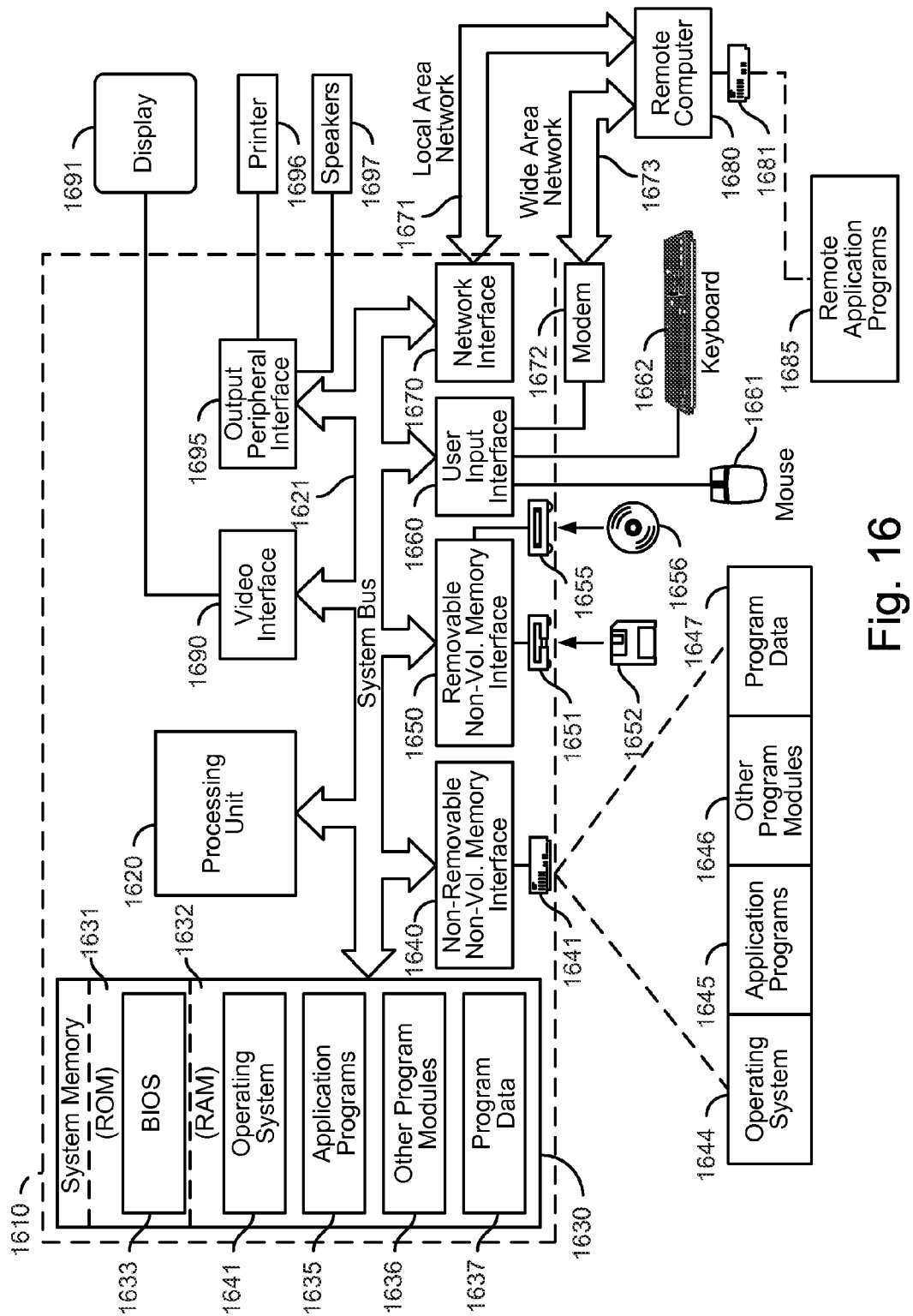
FIG. 16 is a block diagram of computer hardware suitable for implementing embodiments of the invention.

FIG. 16 is a block diagram of computer hardware suitable for implementing embodiments of the invention. The computer hardware can represent any of the computer devices in FIG. 1, for instance. An exemplary system for implementing the invention includes a general purpose computing device in the form of a computer 1610. The computer 1610 may represent a server which provides a user interface, estimate contest, prediction market, and/or scoring rules, for instance. Components of computer 1610 may include, but are not limited to, a processing unit 1620, a system memory 1630, and a system bus 1621 that couples various system components including the system memory to the processing unit 1620. The system bus 1621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1610 typically includes a variety of computer readable media. Computer readable media can be any available media that can be accessed by computer 1610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1610. By way of example, and not limitation, communication media includes wired media such as a wired network or direct-wired connection, and wireless media such as acoustic, RF, infrared and other wireless media. Combinations of any of the above are also included within the scope of computer readable media.

The system memory 1630 includes computer storage media in the form of volatile and/or nonvolatile memory such as read only memory (ROM) 1631 and random access memory (RAM) 1632. A basic input/output system 1633 (BIOS), containing the basic routines that help to transfer information between elements within computer 1610, such as during start-up, is typically stored in ROM 1631. RAM 1632 typically contains data and/or program modules that are immediately accessible to and/or presently being operated on by processing unit 1620. By way of example, and not limitation, FIG. 16 illustrates operating system 1634, application programs 1635, other program modules 1636, and program data 1637.

The computer 1610 may also include other removable/non-removable, volatile/nonvolatile computer storage media. By way of example only, FIG. 16 illustrates a hard disk drive 1641 that reads from or writes to non-removable, nonvolatile magnetic media, a magnetic disk drive 1651 that reads from or writes to a removable, nonvolatile magnetic disk 1652, and an optical disk drive 1655 that reads from or writes to a removable, nonvolatile optical disk 1656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1641 is typically connected to the system bus 1621 through a non-removable memory interface such as interface 1640, and magnetic disk drive 1651 and optical disk drive 1655 are typically connected to the system bus 1621 by a removable memory interface, such as interface 1650.

The drives and their associated computer storage media discussed above and illustrated in FIG. 16, provide storage of computer readable instructions, data structures, program modules and other data for the computer 1610. For example, hard disk drive 1641 is illustrated as storing operating system 1644, application programs 1645, other program modules 1646, and program data 1647. These components can either be the same as or different from operating system 1634, application programs 1635, other program modules 1636, and program data 1637. Operating system 1644, application programs 1645, other program modules 1646, and program data 1647 are given different numbers here to illustrate that, at a minimum, they are different copies. A user may enter commands and information into the computer 1610 through input devices such as a keyboard 1662 and pointing device 1661, commonly referred to as a mouse, trackball or touch pad. Other input devices (not shown) may include a microphone, joystick, game pad, satellite dish, scanner, or the like. These and other input devices are often connected to the processing unit 1620 through a user input interface 1660 that is coupled to the system bus, but may be connected by other interface and bus structures, such as a parallel port, game port or a universal serial bus (USB). A monitor 1691 or other type of display device is also connected to the system bus 1621 via an interface, such as a video interface 1690. In addition to the monitor, computers may also include other peripheral output devices such as speakers 1697 and printer 1696, which may be connected through an output peripheral interface 1695.

The computer 1610 may operate in a networked environment using logical connections to one or more remote computers, such as a remote computer 1680. The remote computer 1680 may be a personal computer, a server, a router, a network PC, a peer device or other common network node, and typically includes many or all of the elements described above relative to the computer 1610, although only a memory storage device 1681 has been illustrated. The logical connections depicted include a local area network (LAN) 1671 and a wide area network (WAN) 1673, but may also include other networks. Such networking environments are commonplace in offices, enterprise-wide computer networks, intranets and the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the user input interface 1660, or other appropriate mechanism. In a networked environment, program modules depicted relative to the computer 1610, or portions thereof, may be stored in the remote memory storage device. By way of example, and not limitation, FIG. 16 illustrates remote application programs 1685 as residing on memory device 1681. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for troubleshooting configuration errors, comprising:
   obtaining a log of events which are generated as a program executes in a learning process;
   analyzing events of the learning process to identify recurring event sequences, each recurring event sequence includes a time sequence of multiple events and occurs a number of times above a predefined threshold;
   generating rules based on the recurring event sequences;
   obtaining a log of events which are generated as the program executes in a detection process;
   applying the rules to events of the detection process to determine if a sequence of events of the detection process violates at least one of the rules; and determining that an error has been detected in the program, and reporting an alarm, when the sequence of the events of the detection process violates at least one of the rules.

2. The computer-implemented method of claim 1, wherein: the applying of the rules includes applying a violation-consistency policy which determines whether a violated rule is consistently violated within a specified amount of time, where if a violated rule has been both followed and violated in the specified amount of time, a violation is treated as a false positive.

3. The computer-implemented method of claim 1, wherein: the sequence of events of the detection process violates at least one of the rules when a violating event appears in place of an expected event; and
the applying of the rules includes applying an expected event disappearance policy which determines whether the expected event appears after the violating event within a specified amount of time;
where if the expected event appears after the violating event within a specified amount of time, a violation is treated as a false positive.

4. The computer-implemented method of claim 1, wherein the generating rules comprises:
generating a trie based on at least a first of the recurring event sequences;
the trie comprises nodes arranged in a hierarchy according to the at least a first of the recurring event sequences, each node corresponding to an event in the at least a first of the recurring event sequences;
marking, as rule edges, edges of nodes which are determined to have, based on the at least a first of the recurring event sequences, only one outgoing transition to a lower node; and
updating the trie based on at least one additional recurring event sequence, the updating comprises unmarking a rule edge of one of the nodes which is determined to have, based further on the at least one additional recurring event sequence, more than one outgoing transition to a lower node.

5. The computer-implemented method of claim 1, wherein the generating rules comprises:
generating a trie based on the recurring event sequences;
the trie comprises nodes arranged in a hierarchy according to the recurring event sequences, each node corresponding to an event in at least one of the recurring event sequences; and
marking, as rule edges, edges of nodes which are determined to have only one outgoing transition to a lower node;
the rules are generated based on sets of nodes connected by rule edge transitions in the trie, the sets of nodes have a specified minimum number of nodes corresponding to a specified minimum number of events.

6. The computer-implemented method of claim 1, wherein: the events which are generated as the program executes in the learning process and in the detection process are from at least one of: (a) different threads of a process, and (b) different threads from different processes, as long as their corresponding processes are launched from a common executable.

7. The computer-implemented method of claim 1, wherein: the events which are generated as the program executes in the learning and detection processes are from different hosts, and the rules are shared across the different hosts in the applying the rules to the events of the detection process.

8. The computer-implemented method of claim 1, wherein: the reporting of an alarm includes providing an output which identifies at least one of: (a) the sequence of the events of the detection process which violates at least one of the rules, (b) a violating event, and (c) an expected event.

9. The computer-implemented method of claim 1, further comprising:
obtaining hierarchical sequences which represent sequences of the events of the learning process by taking one or more input event sequences, and flattening the hierarchical sequences to obtain flattened hierarchical sequences, wherein the flattened hierarchical sequences includes symbols which represent single events but not multiple events, and the recurring event sequences are identified from the flattened hierarchical sequences.

10. The computer-implemented method of claim 1, wherein the log of events of the learning process and the log of events of the detection process comprise registry events regarding registry key accesses, the method further comprising;
when the sequence of the events of the detection process violates at least one of the rules, determining if the registry key involved in either a violating event or an expected event has been one of: (a) deleted and (b) modified; and
restoring the registry key of either the violating event or expected event to an expected key if the registry key has been one of: (a) deleted and (b) modified, the rules identify the expected key.

11. The computer-implemented method of claim 10, further comprising:
restoring a value associated with the registry key to an expected value if the registry key has been one of: (a) deleted and (b) modified, the rules identify the expected value.

12. The computer-implemented method of claim 10, further comprising:
searching earlier registry events in the log of events of the detection process to identifying a process of the program which has one of: (a) deleted and (b) modified, the registry key; and
reporting the process.

13. A computer-implemented method for troubleshooting configuration errors, comprising:
obtaining a log of events which are generated as a program executes, the log of events includes registry events regarding registry key accesses;
applying rules to the events of the log to determine if a sequence of events violates at least one of the rules;
when the sequence of events violates at least one of the rules, determining if the registry key involved in a violating event or an expected event has been one of: (a) deleted and (b) modified; and
restoring the registry key to an expected key if the registry key has been one of: (a) deleted and (b) modified, the rules identify the expected key.

14. The computer-implemented method of claim 13, further comprising:
restoring values associated with the registry key to expected values if the registry key has been one of: (a) deleted and (b) modified, the rules identify the expected values.

15. The computer-implemented method of claim 13, further comprising:

searching earlier registry events in the log of events to identifying a process of the program which has one of: (a) deleted and (b) modified, the registry key; and reporting the process.

16. Computer storage media having computer-readable software embodied thereon for programming at least one processor to perform a method for anomaly detection, the method comprising:

obtaining a log of events which are generated in a learning process;

analyzing events of the learning process to identify recurring event sequences, each recurring event sequence includes a time sequence of multiple events;

generating rules based on the recurring event sequences;

obtaining a log of events which are generated in a detection process, the log of events of the learning process and the log of events of the detection process comprise registry events regarding registry key accesses;

applying the rules to events of the detection process to determine if a sequence of events of the detection process violates at least one of the rules;

determining that an error has been detected in the program, and reporting an alarm, when the sequence of the events of the detection process violates at least one of the rules;

when the sequence of the events of the detection process violates at least one of the rules, determining if the registry key involved in either a violating event or an expected event has been one of: (a) deleted and (b) modified; and restoring the registry key of either the violating event or expected event to an expected key if the registry key has been one of: (a) deleted and (b) modified, the rules identify the expected key.

17. The computer storage media of claim 16, wherein the method performed further comprises:

obtaining hierarchical sequences which represent sequences of the events of the learning process by taking one or more input event sequences, and flattening the hierarchical sequences to obtain flattened hierarchical sequences, wherein the flattened hierarchical sequences includes symbols which represent single events but not multiple events, and the recurring event sequences are identified from the flattened hierarchical sequences.

18. The computer storage media of claim 16, wherein the generating rules comprises:

generating a trie based on at least a first of the recurring event sequences;

the trie comprises nodes arranged in a hierarchy according to the at least a first of the recurring event sequences, each node corresponding to an event in the at least a first of the recurring event sequences;

marking, as rule edges, edges of nodes which are determined to have, based on the at least a first of the recurring event sequences, only one outgoing transition to a lower node; and updating the trie based on at least one additional recurring event sequence, the updating comprises unmarking a rule edge of one of the nodes which is determined to have, based further on the at least one additional recurring event sequence, more than one outgoing transition to a lower node.

* * * * *